(12) United States Patent
Abedini et al.

(10) Patent No.: US 11,917,440 B2
(45) Date of Patent: Feb. 27, 2024

(54) CU-DU SIGNALING TO REPORT CROSS-LINK INTERFERENCE MEASUREMENTS

(71) Applicant: QUALCOMM Incorporated, San Diego, CA (US)

(72) Inventors: Navid Abedini, Basking Ridge, NJ (US); Xipeng Zhu, San Diego, CA (US); Qian Zhang, Basking Ridge, NJ (US); Karl Georg Hampel, Hoboken, NJ (US); Yan Zhou, San Diego, CA (US); Tao Luo, San Diego, CA (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/448,492

(22) Filed: Sep. 22, 2021

(65) Prior Publication Data
US 2022/0104057 A1  Mar. 31, 2022

Related U.S. Application Data

(60) Provisional application No. 63/198,074, filed on Sep. 28, 2020.

(51) Int. Cl.
*H04B 17/24* (2015.01)
*H04B 17/336* (2015.01)
(Continued)

(52) U.S. Cl.
CPC ............ *H04W 24/10* (2013.01); *H04B 17/24* (2015.01); *H04B 17/336* (2015.01);
(Continued)

(58) Field of Classification Search
CPC ..... H04B 7/02–17; H04B 17/0082–409; H04J 11/0023–0093;
(Continued)

(56) References Cited

U.S. PATENT DOCUMENTS

2020/0275298 A1* 8/2020 Xu .................... H04W 24/10
2020/0351065 A1* 11/2020 Esswie .............. H04B 17/336
(Continued)

FOREIGN PATENT DOCUMENTS

CN        111148126 A        5/2020

OTHER PUBLICATIONS

Huawei, et al., "Consideration on Cross-Link Interference in IAB", 3GPP Draft, 3GPP TSG RAN WG1 Meeting #95, R1-1812203, 3GPP TSG RAN WG1 Meeting #95, 3rd Generation Partnership Project (3GPP), Mobile Competence Centre, 650, Route Des Lucioles, F-06921 Sophia-Antipolis Cedex, France, vol. RAN WG1, No. Spokane, USA, Nov. 12, 2018-Nov. 16, 2018, Nov. 11, 2018 (Nov. 11, 2018), 10 Pages. XP051554075, Retrieved from the Internet: URL: http://www.3gpp.org/ftp/Meetings%5F3GPP%5FSYNC/RAN1/Docs/R1%2D1812283%2Ezip, [retrieved on Nov. 11, 2018] Consideration on CLI measurement framework, p. 5, paragraph 3.1_— p. 7, figures 8,9 Consideration on CLI mitigation method, p. 7, paragraph 3.2—p. 8, Paragraph "3 Inter-IAB node CLI".
(Continued)

*Primary Examiner* — Timothy J Weidner
(74) *Attorney, Agent, or Firm* — Harrity & Harrity, LLP

(57) ABSTRACT

Various aspects of the present disclosure generally relate to wireless communication. In some aspects, a central unit (CU) may receive one or more cross-link interference (CLI) measurement reports that are based at least in part on one or more CLI measurements performed by one or more downstream nodes. The CU may transmit, and a distributed unit (DU) may receive, CLI measurement information based at
(Continued)

least in part on the one or more CLI measurement reports. In some aspects, the DU may perform one or more CLI mitigation actions based at least in part on the CLI measurement information received from the CU. Numerous other aspects are provided.

28 Claims, 12 Drawing Sheets

(51) Int. Cl.
*H04J 11/00* (2006.01)
*H04W 24/08* (2009.01)
*H04W 24/10* (2009.01)
*H04W 72/04* (2023.01)
*H04W 72/27* (2023.01)
*H04W 72/29* (2023.01)
*H04W 72/541* (2023.01)
*H04W 84/02* (2009.01)
*H04W 88/02* (2009.01)
*H04W 88/08* (2009.01)
*H04W 88/12* (2009.01)
*H04W 92/02* (2009.01)
*H04W 92/10* (2009.01)
*H04W 92/12* (2009.01)
*H04W 92/20* (2009.01)
*H04W 92/22* (2009.01)

(52) U.S. Cl.
CPC ......... *H04J 11/0026* (2013.01); *H04J 11/005* (2013.01); *H04W 24/08* (2013.01); *H04W 72/04* (2013.01); *H04W 72/27* (2023.01); *H04W 72/29* (2023.01); *H04W 72/541* (2023.01); *H04W 84/02* (2013.01); *H04W 88/02* (2013.01); *H04W 88/085* (2013.01); *H04W 88/12* (2013.01); *H04W 92/02* (2013.01); *H04W 92/10* (2013.01); *H04W 92/12* (2013.01); *H04W 92/20* (2013.01); *H04W 92/22* (2013.01)

(58) Field of Classification Search
CPC ....... H04J 2011/0003–0096; H04W 8/22–245; H04W 24/02–10; H04W 28/02–26; H04W 36/0005–385; H04W 40/005–38; H04W 48/02–20; H04W 52/18–288; H04W 56/0005–0095; H04W 72/02–569; H04W 74/002–0891; H04W 84/005–22; H04W 88/005–188; H04W 92/02–24
See application file for complete search history.

(56) References Cited

U.S. PATENT DOCUMENTS

2021/0250735 A1    8/2021  Hao et al.
2022/0278788 A1*   9/2022  Pedersen .............. H04B 17/345

OTHER PUBLICATIONS

Intel Corporation: "Network Coordination for CLI Management", 3GPP Draft, R1-1900490, 3GPP TSG RAN WG1 Ad-Hoc Meeting 1901, 3rd Generation Partnership Project (3GPP), Mobile Competence Centre, 650, Route Des Lucioles, F-06921 Sophia-Antipolis Cedex, France, vol. RAN WG1, no. Taipei, Jan. 21, 2019-Jan. 25, 2019, Jan. 20, 2019 (Jan. 20, 2019), XP051593403, 4 Pages, Retrieved from the Internet: URL:http://www.3gpp.org/ftp/Meetings%5F3GPP%5FSYNC/RAN1/Docs/R1%2D1900490%2Ezip [retrieved on Jan. 20, 2019] Paragraph "3. Network Coordination for CLI Mitigation".
International Search Report and Written Opinion—PCT/US2021/071566—ISA/EPO—dated Jan. 7, 2022.

* cited by examiner

CU-DU SIGNALING TO REPORT CROSS-LINK INTERFERENCE MEASUREMENTS

CROSS-REFERENCE TO RELATED APPLICATION

This Patent Application claims priority to U.S. Provisional Patent Application No. 63/198,074, filed on Sep. 28, 2020, entitled "CU-DU SIGNALING TO REPORT CROSS-LINK INTERFERENCE MEASUREMENTS," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for central unit-distributed unit (CU-DU) signaling to report cross-link interference (CLI) measurements.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a central unit (CU) includes receiving one or more cross-link interference (CLI) measurement reports that are based at least in part on one or more CLI measurements performed by one or more downstream nodes; and transmitting, to a distributed unit (DU), CLI measurement information based at least in part on the one or more CLI measurement reports.

In some aspects, a method of wireless communication performed by a DU includes receiving, from a CU, CLI measurement information that is based at least in part on one or more CLI measurement reports provided to the CU by one or more downstream nodes; and performing one or more CLI mitigation actions based at least in part on the CLI measurement information received from the CU.

In some aspects, a CU for wireless communication includes a memory; and one or more processors, coupled to the memory, configured to: receive one or more CLI measurement reports that are based at least in part on one or more CLI measurements performed by one or more downstream nodes; and transmit, to a DU, CLI measurement information based at least in part on the one or more CLI measurement reports.

In some aspects, a DU for wireless communication includes a memory; and one or more processors, coupled to the memory, configured to: receive, from a CU, CLI measurement information that is based at least in part on one or more CLI measurement reports provided to the CU by one or more downstream nodes; and perform one or more CLI mitigation actions based at least in part on the CLI measurement information received from the CU.

In some aspects, a non-transitory computer-readable medium storing a set of instructions for wireless communication includes one or more instructions that, when executed by one or more processors of a CU, cause the CU to: receive one or more CLI measurement reports that are based at least in part on one or more CLI measurements performed by one or more downstream nodes; and transmit, to a DU, CLI measurement information based at least in part on the one or more CLI measurement reports.

In some aspects, a non-transitory computer-readable medium storing a set of instructions for wireless communication includes one or more instructions that, when executed by one or more processors of a DU, cause the DU to: receive, from a CU, CLI measurement information that is based at least in part on one or more CLI measurement reports provided to the CU by one or more downstream nodes; and perform one or more CLI mitigation actions based at least in part on the CLI measurement information received from the CU.

In some aspects, an apparatus for wireless communication includes means for receiving one or more CLI measurement reports that are based at least in part on one or more CLI measurements performed by one or more downstream nodes; and means for transmitting, to a DU, CLI measurement information based at least in part on the one or more CLI measurement reports.

In some aspects, an apparatus for wireless communication includes means for receiving, from a CU, CLI measurement information that is based at least in part on one or more CLI measurement reports provided to the CU by one or more downstream nodes; and means for performing one or more CLI mitigation actions based at least in part on the CLI measurement information received from the CU.

Aspects generally include a method, apparatus, system, computer program product, non-transitory computer-readable medium, user equipment, base station, central unit, distributed unit, mobile terminal, node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processor(s), interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
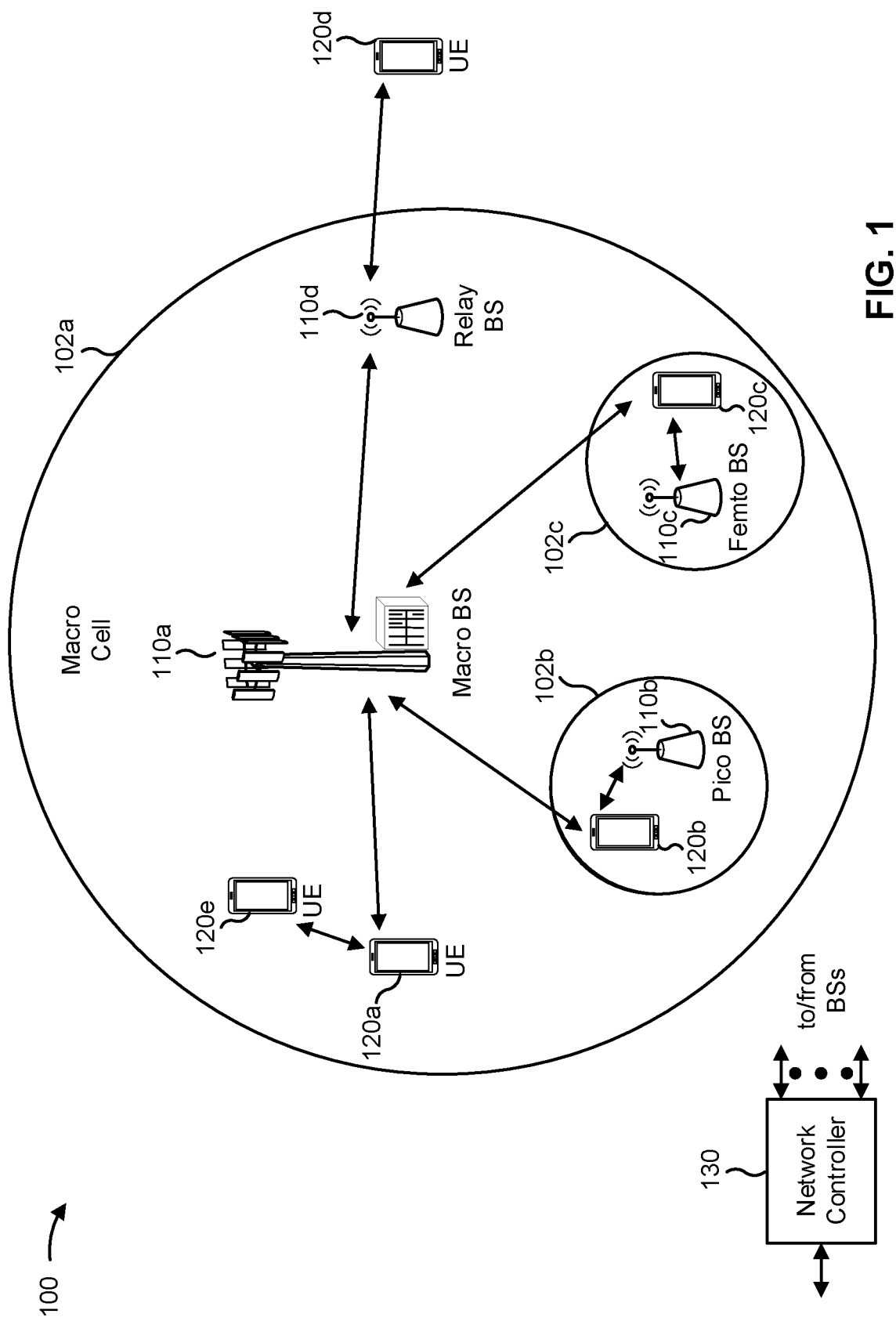
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
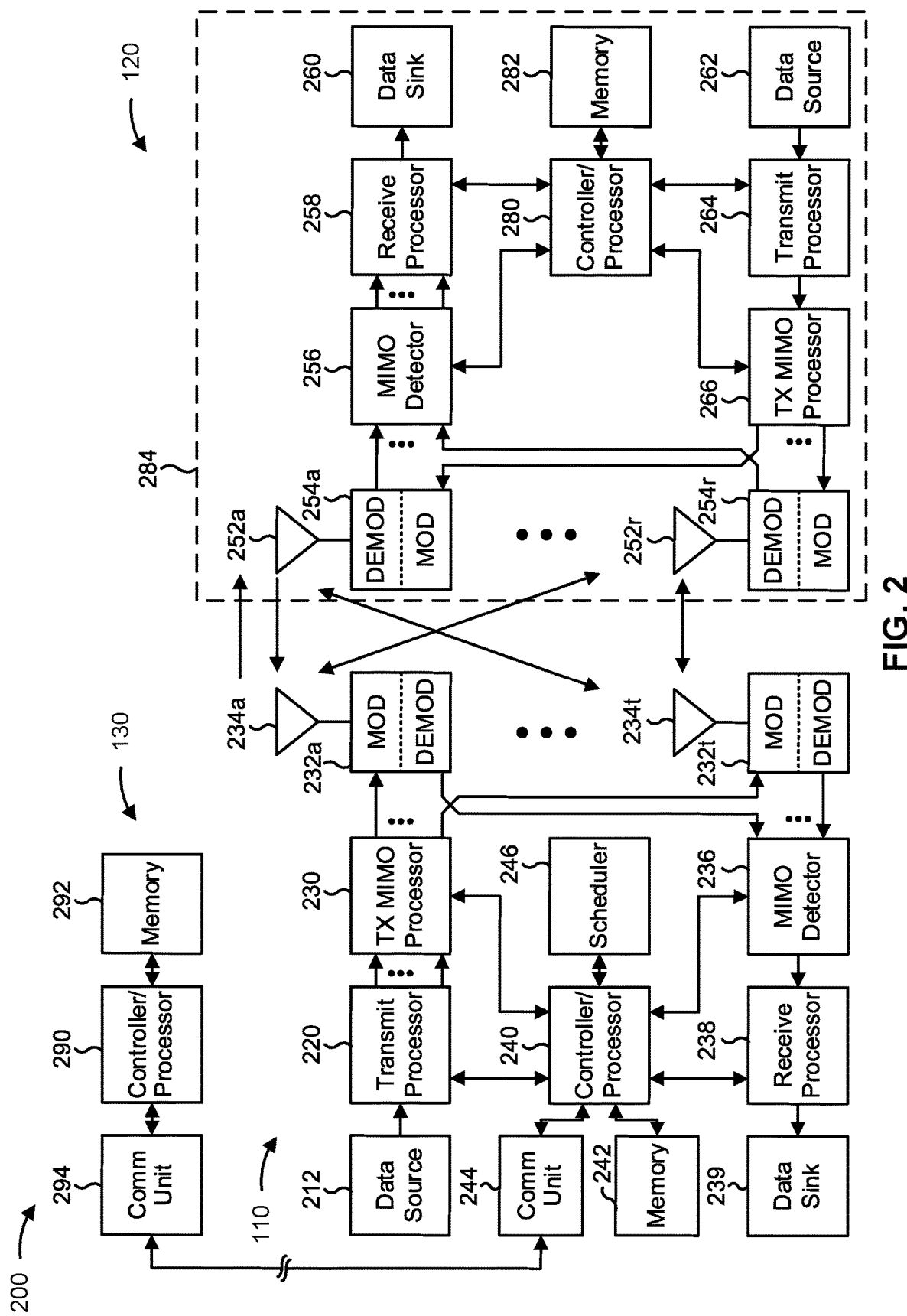
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIG. 8, FIG. 9, and/or FIG. 10).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIG. 8, FIG. 9, and/or FIG. 10).

Controller/processor 240 of base station 110, controller/processor 280 of UE 120, and/or any other component(s) of FIG. 2 may perform one or more techniques associated with central unit-distributed unit (CU-DU) signaling for reporting cross-link interference (CLI) measurements, as described in more detail elsewhere herein. For example, controller/processor 240 of base station 110, controller/processor 280 of UE 120, and/or any other component(s) of FIG. 2 may perform or direct operations of, for example, process 900 of FIG. 9, process 1000 of FIG. 10, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some aspects, executing instructions may include running the instructions, converting the instructions, compiling the instructions, and/or interpreting the instructions, among other examples.

In some aspects, the base station 110 includes a central unit (CU) that includes means for receiving one or more CLI measurement reports that are based at least in part on one or more CLI measurements performed by one or more downstream nodes; and/or means for transmitting, to a distributed unit (DU), CLI measurement information based at least in part on the one or more CLI measurement reports. The means for the CU to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the CU includes means for receiving, from the DU, a request for CLI measurement information associated with one or more UEs served by the DU, one or more child nodes associated with the DU, one or more cells associated with the DU, or one or more neighboring cells associated with the DU, wherein the CLI measurement information is transmitted to the DU based at least in part on the request.

In some aspects, the base station 110 includes a DU that includes means for receiving, from a CU, CLI measurement information that is based at least in part on one or more CLI measurement reports provided to the CU by one or more downstream nodes; and/or means for performing one or more CLI mitigation actions based at least in part on the CLI measurement information received from the CU. The means for the DU to perform operations described herein may include, for example, transmit processor 220, TX MIMO processor 230, modulator 232, antenna 234, demodulator 232, MIMO detector 236, receive processor 238, controller/processor 240, memory 242, and/or scheduler 246.

In some aspects, the DU includes means for transmitting, to the CU, a request for CLI measurement information associated with one or more UEs served by the DU, one or more child nodes associated with the DU, one or more cells associated with the DU, or one or more neighboring cells associated with the DU, and the CLI measurement information is received from the CU based at least in part on the request.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
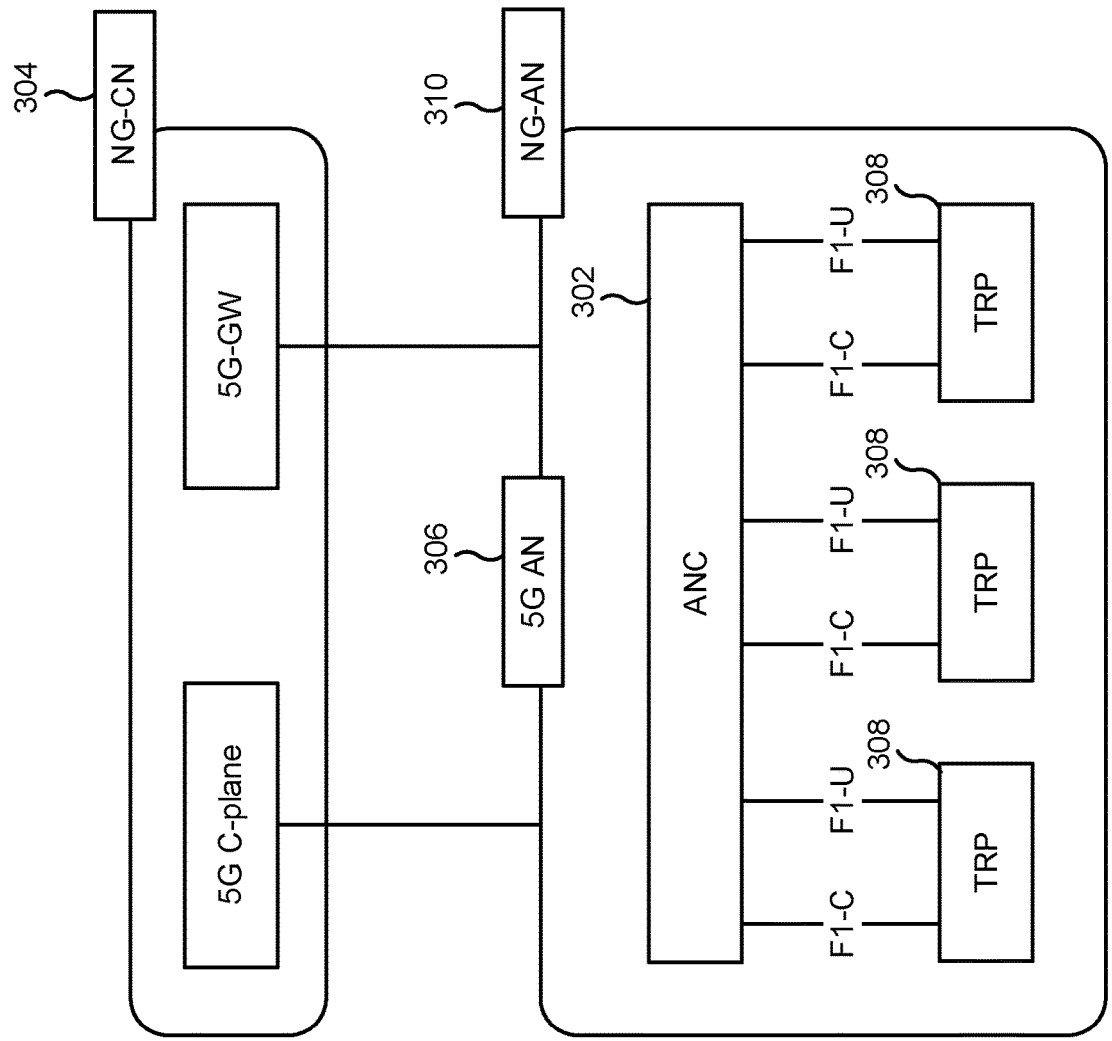
FIG. 3 illustrates an example logical architecture of a distributed radio access network (RAN), in accordance with the present disclosure.

FIG. 3 illustrates an example logical architecture of a distributed radio access network (RAN) 300, in accordance with the present disclosure. A 5G access node 306 may include an access node controller (ANC) 302. The ANC 302 may be a base station CU of the distributed RAN 300. In some aspects, a backhaul interface to a next generation core network (NG-CN) 304 may terminate at the ANC 302. The backhaul interface to neighboring next generation access nodes (NG-ANs) 310 may terminate at the ANC 302.

In some aspects, the ANC 302 may include one or more TRPs 308 (which may also be referred to as BSs, NR BSs, Node Bs, 5G NBs, APs, gNB, or some other term). As described above, "TRP" may be used interchangeably with "cell." The TRPs 308 may be a base station DU. The TRPs 308 may be connected to one ANC (e.g., ANC 302) or to more than one ANC (not illustrated). For example, for RAN sharing, radio as a service (RaaS), and service specific ANC deployments, a TRP 308 may be connected to more than one ANC 302. A TRP 308 may include one or more antenna ports. The TRPs 308 may be configured to serve traffic to a UE individually (e.g., using dynamic selection) or jointly (e.g., using joint transmission).

The local architecture of RAN 300 may be used to illustrate fronthaul communication. The architecture may be defined to support fronthauling solutions across different deployment types. For example, the architecture may be based at least in part on transmit network capabilities (e.g., bandwidth, latency, and/or jitter).

The architecture may share features and/or components with LTE. According to some aspects, the NG-AN 310 may support dual connectivity with NR. The NG-AN 310 may share a common fronthaul for LTE and NR.

The architecture may enable cooperation between and among TRPs 308. For example, cooperation may be preset within a TRP 308 and/or across TRPs 308 via the ANC 302. According to aspects, no inter-TRP interface may be needed or present.

According to some aspects, a dynamic configuration of split logical functions may be present within the architecture of RAN 300. The packet data convergence protocol (PDCP), radio link control (RLC), or medium access control (MAC) protocol may be adaptably placed at the ANC or TRP.

According to some aspects, a base station may include a CU (e.g., ANC 302) and/or one or more DUs (e.g., one or more TRPs 308).

As indicated above, FIG. 3 is provided as an example. Other examples may differ from what is described with regard to FIG. 3.

Figure 4:
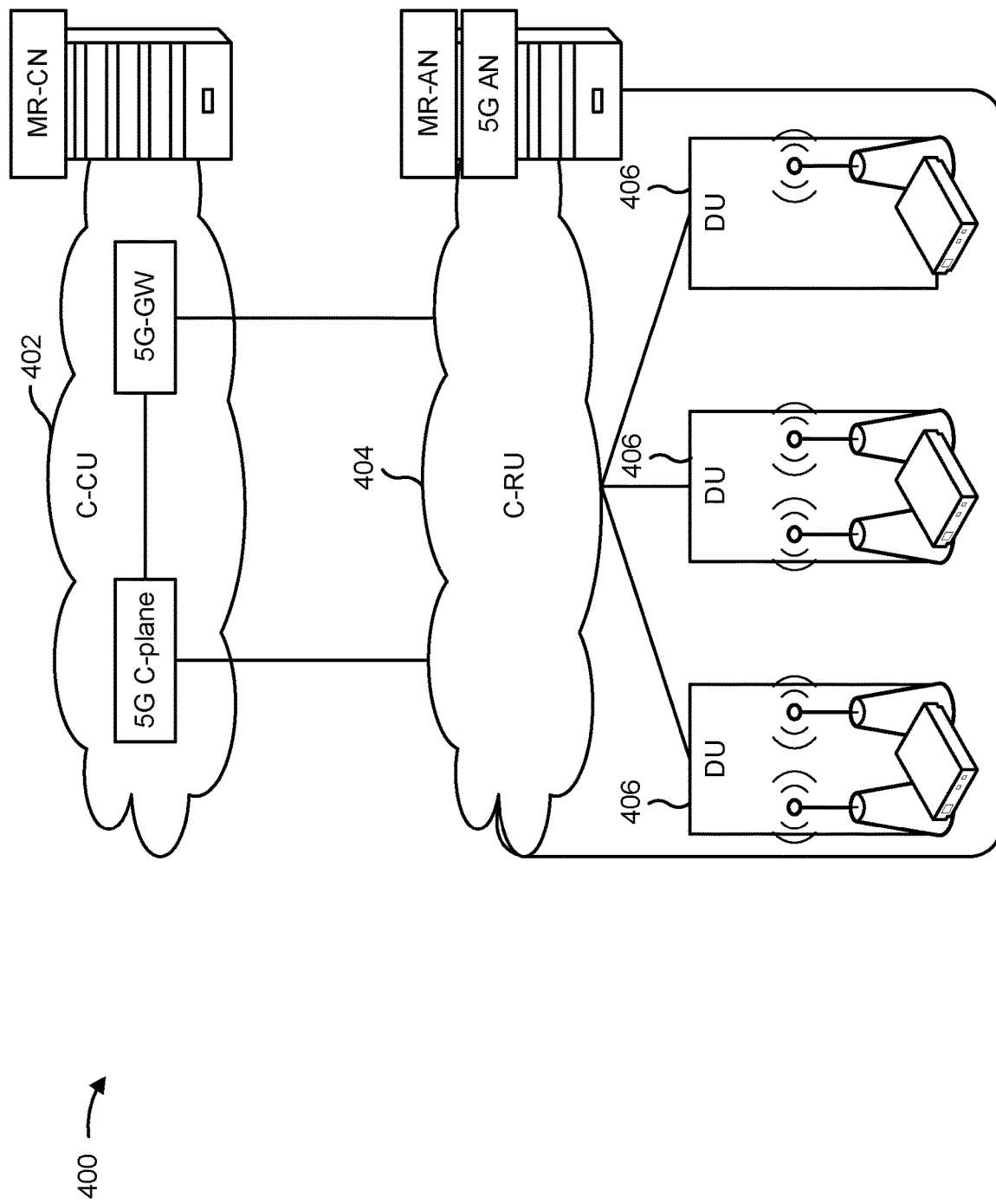
FIG. 4 illustrates an example physical architecture of a distributed RAN, in accordance with the present disclosure.

FIG. 4 illustrates an example physical architecture of a distributed RAN 400, in accordance with the present disclosure. As shown in FIG. 4, a centralized core network unit (C-CU) 402 may host core network functions. The C-CU 402 may be centrally deployed. Functionality of the C-CU 402 may be offloaded (e.g., to advanced wireless services (AWS)), in an effort to handle peak capacity.

A centralized RAN unit (C-RU) 404 (which may also be referred to as a base station CU) may host one or more ANC functions. Optionally, the C-RU 404 may host core network functions locally. The C-RU 404 may have distributed deployment. The C-RU 404 may be closer to the network edge.

A base station DU 406 may host one or more TRPs. The base station DU 406 may be located at edges of the network with radio frequency (RF) functionality.

As indicated above, FIG. 4 is provided as an example. Other examples may differ from what is described with regard to FIG. 4.

Figure 5:
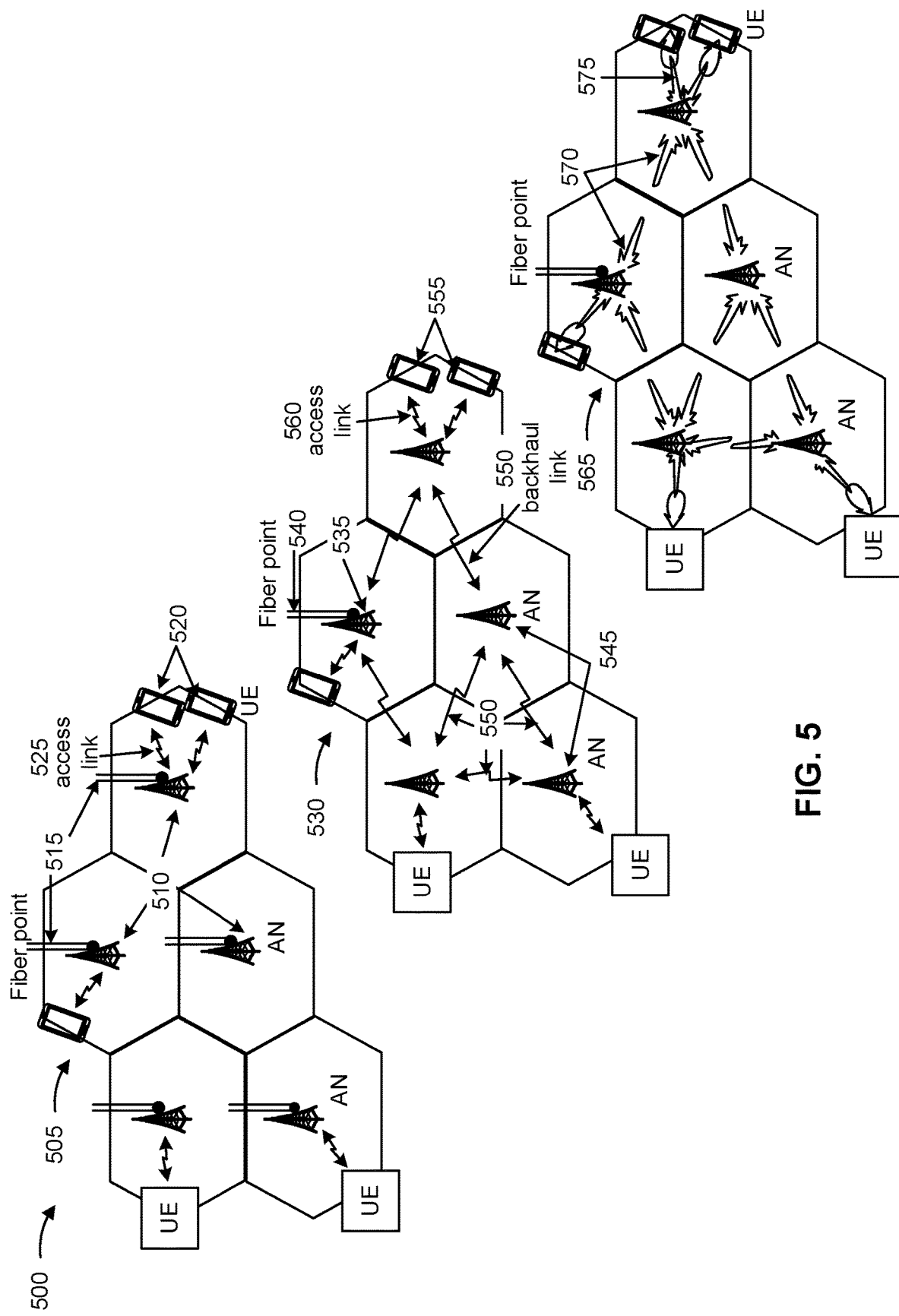
FIG. 5 is a diagram illustrating examples of RANs, in accordance with the present disclosure.

FIG. 5 is a diagram illustrating examples 500 of radio access networks, in accordance with the present disclosure.

As shown by reference number 505, a traditional (e.g., 3G, 4G, LTE, and/or the like) radio access network may include multiple base stations 510 (e.g., access nodes (AN)), where each base station 510 communicates with a core network via a wired backhaul link 515, such as a fiber connection. A base station 510 may communicate with a UE 520 via an access link 525, which may be a wireless link. In some aspects, a base station 510 shown in FIG. 5 may be a base station 110 shown in FIG. 1. In some aspects, a UE 520 shown in FIG. 5 may be a UE 120 shown in FIG. 1.

As shown by reference number 530, a radio access network may include a wireless backhaul network, sometimes referred to as an integrated access and backhaul (IAB) network. In an IAB network, at least one base station is an anchor base station 535 that communicates with a core network via a wired backhaul link 540, such as a fiber connection. An anchor base station 535 may also be referred to as an IAB donor (or IAB-donor). The IAB network may include one or more non-anchor base stations 545, sometimes referred to as relay base stations or IAB nodes (or IAB-nodes). The non-anchor base station 545 may communicate directly or indirectly with the anchor base station 535 via one or more backhaul links 550 (e.g., directly communicating with the anchor base station 535 or communicating via one or more non-anchor base stations 545) to form a backhaul path to the core network for carrying backhaul traffic. Backhaul link 550 may be a wireless link. Anchor base station(s) 535 and/or non-anchor base station(s) 545 may communicate with one or more UEs 555 via access links 560, which may be wireless links for carrying access traffic. In some aspects, an anchor base station 535 and/or a non-anchor base station 545 shown in FIG. 5 may be a base station 110 shown in FIG. 1. In some aspects, a UE 555 shown in FIG. 5 may be a UE 120 shown in FIG. 1.

As shown by reference number 565, in some aspects, a radio access network that includes an IAB network may utilize millimeter wave technology and/or directional communications (e.g., beamforming and/or the like) for communications between base stations and/or UEs (e.g., between two base stations, between two UEs, and/or between a base station and a UE). For example, wireless backhaul links 570 between base stations may use millimeter wave signals to carry information and/or may be directed toward a target base station using beamforming and/or the like. Similarly, the wireless access links 575 between a UE and a base station may use millimeter wave signals and/or may be directed toward a target wireless node (e.g., a UE and/or a base station). In this way, cross-link interference may be reduced.

The configuration of base stations and UEs in FIG. 5 is shown as an example, and other examples are contemplated. For example, one or more base stations illustrated in FIG. 5 may be replaced by one or more UEs that communicate via a UE-to-UE access network (e.g., a peer-to-peer network, a device-to-device network, and/or the like). In this case, an anchor node may refer to a UE that is directly in communication with a base station (e.g., an anchor base station or a non-anchor base station).

As indicated above, FIG. 5 is provided as an example. Other examples may differ from what is described with regard to FIG. 5.

Figure 6:
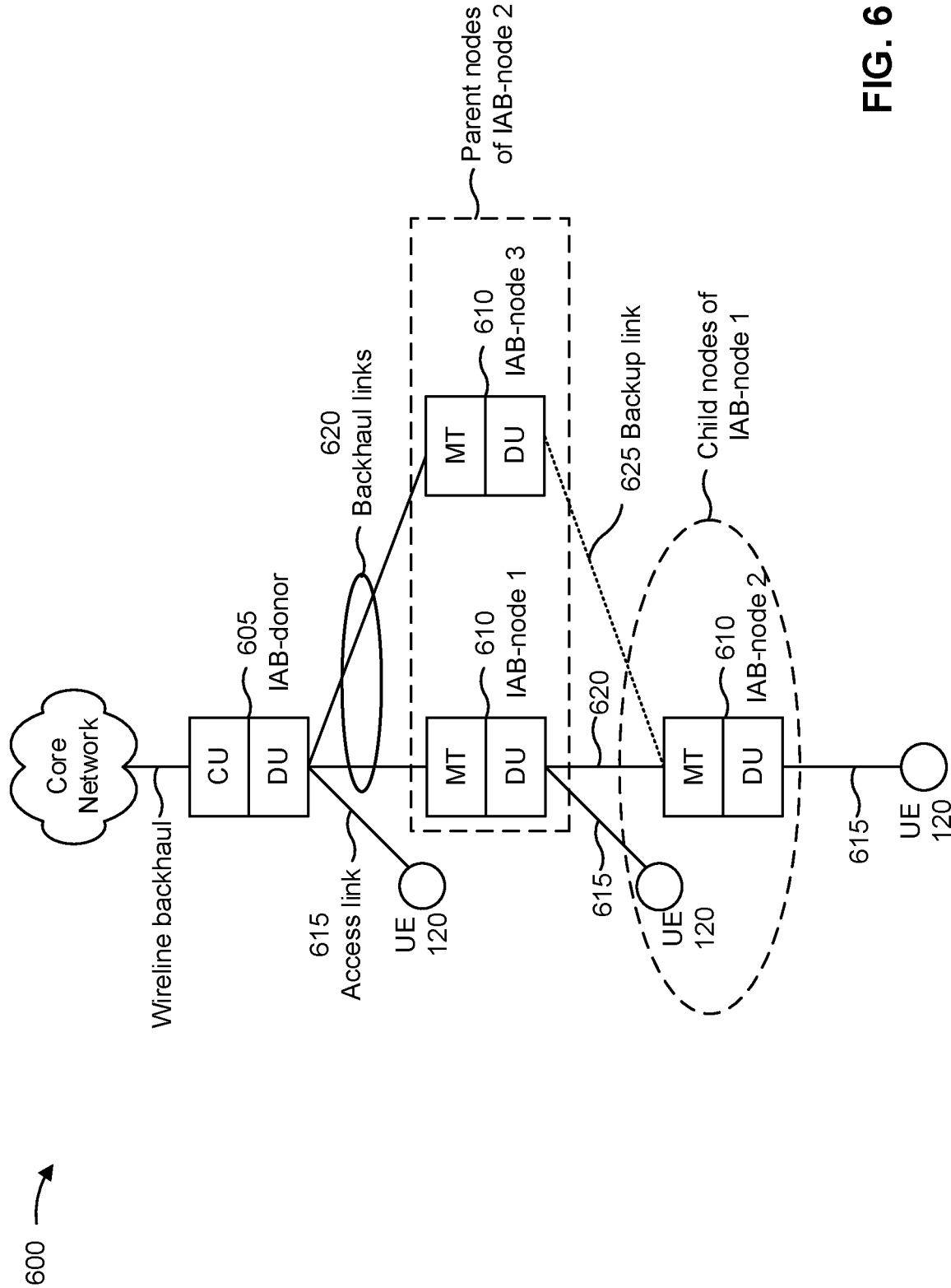
FIG. 6 is a diagram illustrating an example of an integrated access and backhaul (IAB) network architecture, in accordance with the present disclosure.

FIG. 6 is a diagram illustrating an example 600 of an IAB network architecture, in accordance with the present disclosure.

As shown in FIG. 6, an IAB network may include an IAB donor 605 (shown as IAB-donor) that connects to a core network via a wired connection (shown as a wireline backhaul). For example, an Ng interface of an IAB donor 605 may terminate at a core network. Additionally, or alternatively, an IAB donor 605 may connect to one or more devices of the core network that provide a core access and mobility management function (AMF). In some aspects, an IAB donor 605 may include a base station 110, such as an anchor base station, as described above in connection with FIG. 5. As shown, an IAB donor 605 may include a CU, which may perform ANC functions, AMF functions, and/or the like. The CU may configure a DU of the IAB donor 605 and/or may configure one or more IAB nodes 610 (e.g., a mobile termination (MT) and/or a DU of an IAB node 610) that connect to the core network via the IAB donor 605. Thus, a CU of an IAB donor 605 may control and/or configure the entire IAB network that connects to the core network via the IAB donor 605, such as by using control messages and/or configuration messages (e.g., a radio resource control (RRC) configuration message, an F1 application protocol (F1AP) message, and/or the like).

As further shown in FIG. 6, the IAB network may include IAB nodes 610 (shown as IAB-node 1, IAB-node 2, and IAB-node 3) that connect to the core network via the IAB donor 605. As shown, an IAB node 610 may include MT functions (also sometimes referred to as UE functions (UEF)) and may include DU functions (also sometimes referred to as access node functions (ANF)). The MT functions of an IAB node 610 (e.g., a child node) may be controlled and/or scheduled by another IAB node 610 (e.g., a parent node of the child node) and/or by an IAB donor 605. The DU functions of an IAB node 610 (e.g., a parent node) may control and/or schedule other IAB nodes 610 (e.g., child nodes of the parent node) and/or UEs 120. Thus, a DU may be referred to as a scheduling node or a scheduling component, and an MT may be referred to as a scheduled node or a scheduled component. In some aspects, an IAB donor 605 may include DU functions and not MT functions. That is, an IAB donor 605 may configure, control, and/or schedule communications of IAB nodes 610 and/or UEs 120. A UE 120 may include only MT functions, and not DU functions. That is, communications of a UE 120 may be controlled and/or scheduled by an IAB donor 605 and/or an IAB node 610 (e.g., a parent node of the UE 120).

When a first node controls and/or schedules communications for a second node (e.g., when the first node provides DU functions for the MT functions of the second node), the first node may be referred to as a parent node of the second node, and the second node may be referred to as a child node of the first node. A child node of the second node may be referred to as a grandchild node of the first node. Thus, a DU function of a parent node may control and/or schedule communications for child nodes of the parent node. A parent node may be an IAB donor 605 or an IAB node 610, and a child node may be an IAB node 610 or a UE 120. Communications of an MT function of a child node may be controlled and/or scheduled by a parent node of the child node.

As further shown in FIG. 6, a link between a UE 120 (e.g., which only has MT functions, and not DU functions) and an IAB donor 605, or between a UE 120 and an IAB node 610, may be referred to as an access link 615. Access link 615 may be a wireless access link that provides a UE 120 with radio access to a core network via an IAB donor 605, and optionally via one or more IAB nodes 610. Thus, the network illustrated in FIG. 6 may be referred to as a multi-hop network or a wireless multi-hop network.

As further shown in FIG. 6, a link between an IAB donor 605 and an IAB node 610 or between two IAB nodes 610 may be referred to as a backhaul link 620. Backhaul link 620 may be a wireless backhaul link that provides an IAB node 610 with radio access to a core network via an IAB donor 605, and optionally via one or more other IAB nodes 610. In an IAB network, network resources for wireless communications (e.g., time resources, frequency resources, spatial resources, and/or the like) may be shared between access links 615 and backhaul links 620. In some aspects, a backhaul link 620 may be a primary backhaul link or a secondary backhaul link (e.g., a backup backhaul link). In some aspects, a secondary backhaul link 625 may be used if a primary backhaul link 620 fails, becomes congested, becomes overloaded, and/or the like. For example, a secondary backhaul link 625 between IAB-node 2 and IAB-node 3 may be used for backhaul communications if the primary backhaul link between IAB-node 2 and IAB-node 1 fails. As used herein, a node or a wireless node may refer to an IAB donor 605 or an IAB node 610.

As indicated above, FIG. 6 is provided as an example. Other examples may differ from what is described with regard to FIG. 6.

Figure 7:
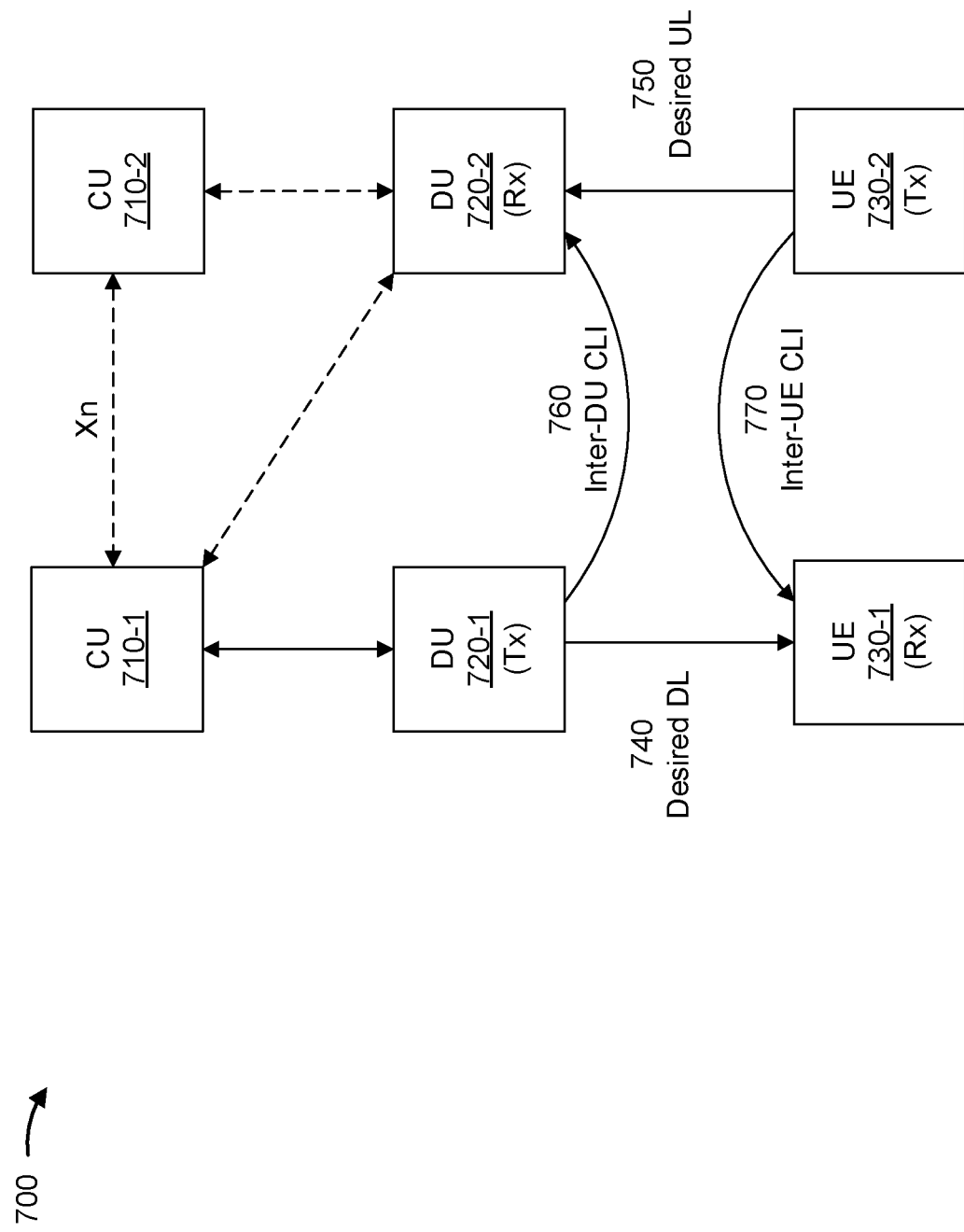
FIG. 7 is a diagram illustrating examples relating to cross-link interference (CLI), in accordance with the present disclosure.

FIG. 7 is a diagram illustrating examples 700 relating to CLI, in accordance with the present disclosure.

In dynamic time division duplexing (TDD), the allocation of network resources to uplink and downlink may be dynamically modified depending on a traffic load. For example, a base station CU 710 may configure a TDD configuration (e.g., a TDD pattern) with more uplink transmission time intervals (TTIs) (e.g., frames, subframes, slots, mini-slots, symbols, and/or the like) for a downstream node (e.g., a base station DU 720 associated with the base station CU 710, a UE 730 served by the base station 720, an MT or child node associated with an IAB node, and/or the like) when the downstream node has uplink data to transmit, and may configure a TDD configuration with more downlink TTIs for the downstream node when the downstream node has downlink data to receive. The TDD configuration may be dynamically configured to modify the allocation of uplink TTIs and downlink TTIs used for communication between base station CUs 710, base station DUs 720 and associated IAB child nodes, UEs 730, and/or IAB parent nodes.

As shown in FIG. 7, when neighboring base stations 720 use different TDD configurations to communicate with downstream UEs 730 (or other downstream nodes, such as child IAB nodes), this may result in a downlink communication 740 between a first base station DU 720-1 and a first UE 730-1 that at least partially overlaps in the time domain an uplink communication 750 between a second base station DU 720-2 and a second UE 730-2 (e.g., the downlink communication 740 and the uplink communication 750 occur in a same TTI). These communications in different transmission directions (e.g., downlink vs. uplink) in the same TTI may interfere with one another, which may be referred to as inter-DU CLI.

For example, as shown by reference number 760, the downlink communication 740 transmitted by the first base station DU 720-1 may be received by the second base station DU 720-2, and may interfere with reception, by the second base station DU 720-2, of the uplink communication 750 from the second UE 730-2. This may be referred to as downlink-to-uplink (DL-to-UL) interference, base station to base station interference, gNB to gNB interference, inter-DU CLI, and/or the like.

Further, as shown by reference number 770, the uplink communication 750 transmitted by the second UE 730-2 may be received by the first UE 730-1, and may interfere with reception, by the first UE 730-1, of the downlink communication 740 from the first base station DU 720-1. This may be referred to as uplink-to-downlink (UL-to-DL) interference, UE-to-UE interference, inter-UE CLI, and/or the like. This inter-UE CLI may occur and/or may increase when the first UE 730-1 and the second UE 730-2 are in close proximity, and may be avoided or mitigated by preventing scheduling of the UEs 730 in different transmission directions in the same TTI.

Inter-DU CLI 760 and/or inter-UE CLI 770 can result in reception issues for downlink communication 740 and/or uplink communication 750, such as a reduced receive power for downlink communication 740 and/or uplink communication 750, difficulty in demodulating downlink communication 740 and/or uplink communication 750, decoding errors for downlink communication 740 and/or uplink communication 750, and/or other issues. These and other reception issues can result in dropped or unreceivable communications at victim nodes (e.g., base station DU 720-2 and/or UE 730-1) experiencing CLI caused by aggressor nodes (e.g., base station DU 720-1 and/or UE 730-2), which can cause reception delays, reduce reliability, and/or an increase in retransmissions (which consumes additional power, memory, processing, and radio resources of the victim nodes and the nodes performing the retransmissions).

Accordingly, in some cases, a base station CU 710 may configure one or more downstream nodes to perform and report one or more CLI measurements in order to detect and/or mitigate inter-DU CLI and/or inter-UE CLI. For example, UE-to-UE CLI measurements may be based on sounding reference signal (SRS) transmissions or CLI received signal strength indicator (CLI-RSSI) transmissions, which may be configured by RRC signaling (e.g., using a CLI measurement object, such as a MeasObjectCLI information element). In such cases, the base station CU 710 may receive a Layer 3 (L3) CLI measurement report from a downstream UE 730, whereby CLI detection and mitigation is controlled by the base station CU 710 and is transparent to base station DUs 720 that are downstream nodes of the base station CU 710. For example, a base station CU 710 may mitigate CLI caused by or experienced by a downstream node by configuring dedicated TDD patterns in which neighboring downstream nodes are not scheduled in different transmission directions in the same TTI. Additionally, or alternatively, the base station CU 710 may configure one or more handover parameters, power control parameters, and/or other communication parameters to mitigate CLI caused by or experienced by a downstream node. Additionally, or alternatively, the base station CU 710 may provide a downstream base station DU 720 with an intended TDD configuration of neighboring cells, which the base station DU 720 may take into account to avoid or mitigate downstream CLI (e.g., inter-UE CLI) when scheduling downstream UEs 730, downstream IAB child nodes, and/or the like.

However, efforts to detect and/or mitigate CLI in a wireless network may be hampered due to a lack of standardized techniques to measure inter-DU CLI and/or provide a local CLI management framework at a base station DU 720. For example, as described above, UE-to-UE CLI measurements may be configured based on SRS transmissions and/or CLI-RSSI transmissions by RRC signaling, and CLI measurement reports are controlled by the base station CU 710 and transparent to the base station DU 720 that resides between a UE 730 and a base station CU 710. This may create inefficiencies because the base station DUs 720 are unable to locally manage CLI (e.g., in cases where there is consistent and/or strong CLI due to fixed IAB nodes, where IAB nodes are deployed in proximity to one another, or where IAB nodes are mobile and may come into proximity with one another, among other examples).

Some aspects described herein relate to signaling between a CU and a DU (CU-DU signaling) to enable local CLI management (e.g., CLI detection and/or mitigation) by the DU. For example, in some aspects, the DU may be connected to a CU that receives one or more CLI measurements and/or CLI measurement reports that contain CLI measurements, and the CU may provide the DU with a result of the CLI measurements to enable local CLI management by the DU. For example, the CU may provide, to the DU, CLI measurements performed and reported by one or more nodes that are downstream from the DU (e.g., UEs served by the DU, child IAB nodes of the DU), one or more neighboring DUs or nodes that are downstream from the neighboring DUs, and/or one or more nodes that are downstream from another CU. In some aspects, the CLI measurement information provided to the DU may include detailed information (e.g., CLI metrics, victim and/or aggressor identities, and/or the like) and/or filtered information (e.g., victim and/or aggressor nodes causing or experiencing CLI). In this way, the DU may integrate the CLI measurement information into a local CLI management framework such that the DU may perform one or more actions to mitigate CLI experienced by and/or caused by one or more nodes downstream from the DU.

As indicated above, FIG. 7 is provided as an example. Other examples are possible and may differ from what was described with respect to FIG. 7.

Figure 8:
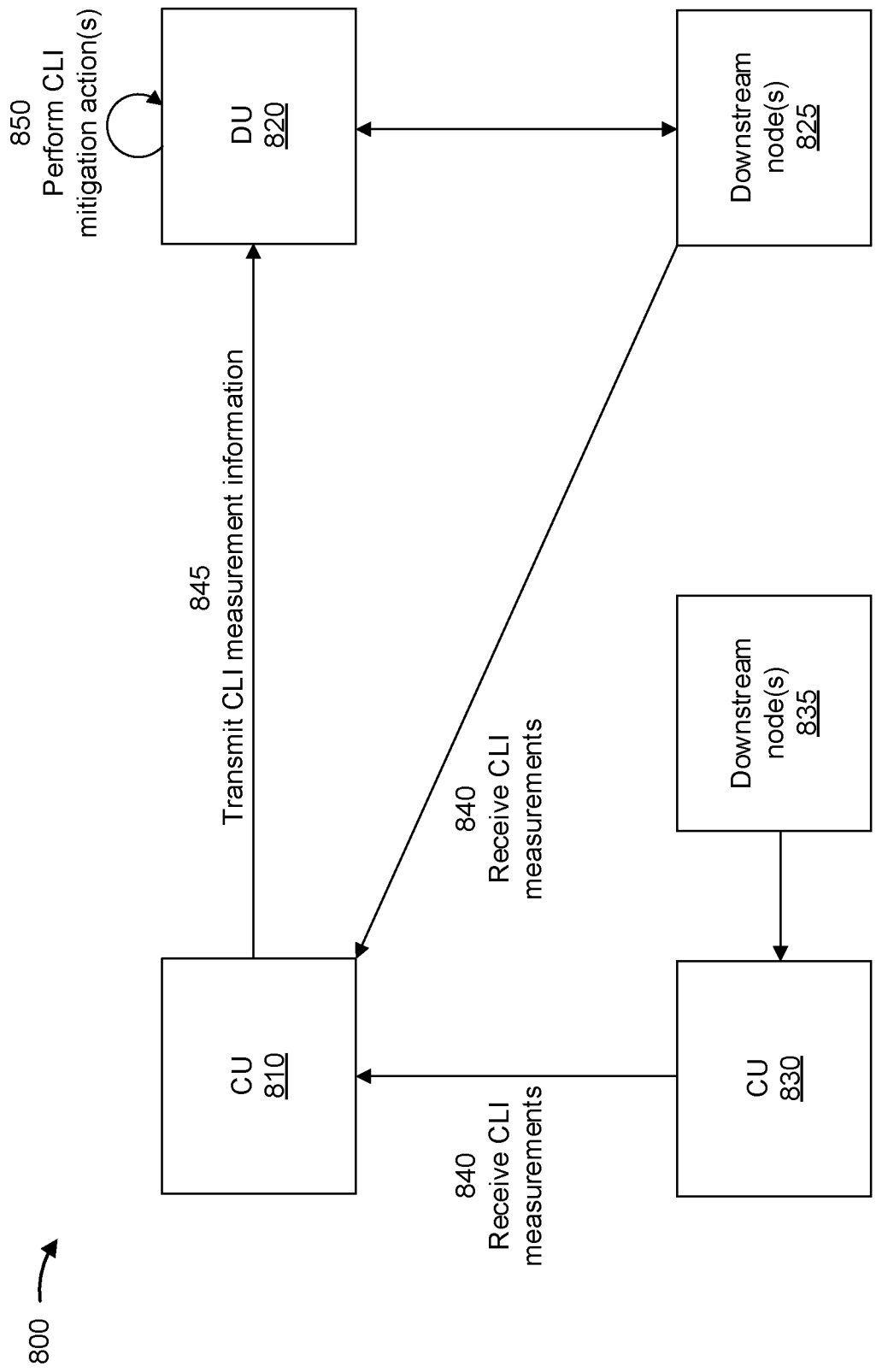
FIG. 8 is a diagram illustrating an example associated with central unit-distributed unit (CU-DU) signaling to report CLI measurements, in accordance with the present disclosure.

FIG. 8 is a diagram illustrating an example 800 associated with CU-DU signaling to report CLI measurements, in accordance with the present disclosure. As shown in FIG. 8, example 800 includes a base station CU 810 (shown as and described herein as CU 810) connected to a base station DU 820 (shown as and described herein as DU 820), which may communicate with one or more downstream nodes (e.g., one or more served UEs, one or more child IAB nodes, and/or the like). In addition, CU 810 may be configured to communicate over an Xn interface with another base station CU 830 that communicates with one or more downstream nodes 835. In some aspects, as described herein, the CU 810 may provide the DU 820 with CLI measurement information using CU-DU signaling to enable a local CLI management framework to be implemented at the DU 820 such that the DU 820 may detect and/or mitigate CLI that may be caused by or experienced by the downstream nodes 825.

As shown in FIG. 8, and by reference number 840, the CU 810 may receive CLI measurements performed by one or more downstream nodes. For example, in some aspects, the CLI measurements may be performed by the downstream nodes 825 in communication with the DU 820 (e.g., one or more UEs served by the DU 820, one or more child IAB nodes of the DU 820 in cases where the DU 820 is an IAB node, and/or the like). Additionally, or alternatively, the CLI measurements may be performed by other DUs (not shown) that are connected to the CU 810 or one or more UEs or child IAB nodes associated with the other DUs. In such cases, where the CLI measurements are performed by one or more nodes that are downstream from (e.g., managed by) the CU 810, the CU 810 may receive the CLI measurements directly from the one or more downstream nodes in one or more L3 CLI measurement reports that are generally transparent to the DU 820 or the neighboring DU(s) that reside between the CU 810 and the downstream nodes performing and reporting the CLI measurements. Additionally, or alternatively, the CU 810 may receive CLI measurement information from the neighboring CU 830 over an Xn interface. In such cases, the neighboring CU 830 may receive CLI measurement reports directly from the downstream nodes 835 managed by the neighboring CU 830, and the neighboring CU 830 may provide the CLI measurement reports and/or information contained in or otherwise associated with the CLI measurement reports to the CU 810 (e.g., using inter-CU signaling).

As further shown in FIG. 8, and by reference number 845, the CU 810 may transmit, and the DU 820 may receive, CLI measurement information based at least in part on the CLI measurements or CLI measurement reports received by the CU 810. For example, in some aspects, the CLI measurement information provided from the CU 810 to the DU 820 may include information associated with CLI measurements performed and reported by one or more UEs that are included among the downstream nodes 825 associated with the DU 820. Additionally, or alternatively, in cases where the DU is an IAB node, the CLI measurement information provided to the DU 820 may include information associated with CLI measurements performed and reported by one or more child IAB nodes included among the downstream nodes 825 of the DU 820. In such cases, the CLI measurement information may generally indicate CLI experienced by the downstream nodes 825 and/or potential sources of the CLI experienced by the downstream nodes 825.

Additionally, or alternatively, the CLI measurement information provided to the DU 820 may include inter-DU CLI measurements performed and reported by a neighboring DU experiencing CLI potentially caused by UEs, child IAB nodes, and/or cells of the DU 820, CLI measurements performed and reported by one or more UEs, child IAB nodes, or other nodes that are downstream from a neighboring DU and experiencing CLI potentially caused by UEs, child IAB nodes, and/or cells of the DU 820, and/or the like. Additionally, or alternatively, the CLI measurement information provided to the DU 820 may include information related to CLI measurements performed by the downstream nodes 835 of the neighboring CU 830 that reports the CLI measurements to the CU 810 over the Xn interface.

In some aspects, the CLI measurement information that the CU 810 provides to the DU 820 may be provided in a detailed report that includes detailed information about the CLI measurements. For example, in some aspects, the CLI measurement information provided to the DU 820 may include one or more CLI metrics (e.g., an RSRP, an RSSI, a signal-to-noise ratio (SNR), and/or a signal-to-interference-plus noise ratio (SINR)) measured by one or more victim nodes experiencing CLI caused by one or more aggressor nodes. For example, in some aspects, the aggressor nodes may be configured to transmit one or more reference signals and/or CLI-RSSI transmissions, and the victim nodes may be configured with one or more CLI measurement objects to measure the CLI metrics based at least in part on the reference signal and/or CLI-RSSI transmissions by the aggressor nodes. Accordingly, in some aspects, the detailed information provided from the CU 810 to the DU 820 may include the measured CLI metrics that are reported to the CU 810 and/or identifiers associated with one or more victim nodes that are experiencing CLI and/or one or more aggressor nodes (e.g., UEs, cells, DUs, and/or child IAB nodes) that are potentially causing the CLI experienced by the one or more victim nodes.

Additionally, or alternatively, the detailed information provided from the CU 810 to the DU 820 may include identifiers associated with one or more beams of the victim node(s) and/or the aggressor node(s) that are associated with the CLI (e.g., synchronization signal block (SSB) indexes, channel state information reference signal (CSI-RS) indexes, and/or measurement resource indexes, among other examples). For example, the aggressor node(s) may be transmitting signals using different beams and/or using different time and/or frequency resources. Accordingly, providing the DU 820 with the identifiers of the beams of the victim node(s) and/or the aggressor node(s) that are associated with the CLI may enable the DU 820 to determine which beams or resources are associated with CLI to be mitigated.

Additionally, or alternatively, the detailed information provided from the CU 810 to the DU 820 may include an estimated delay or an estimated round trip time (RTT) between the victim node(s) and the aggressor node(s). In this way, the DU 820 may determine how to align timing of interfering signals to enable digital interference cancellation based at least in part on the estimated delay or estimated RTT between the victim node(s) and the aggressor node(s). For example, in some aspects, the digital interference cancellation techniques may depend on orthogonality between the interfering signals, which may be achieved by scheduling the interfering signals to be within a cyclic prefix of each other. Accordingly, providing the DU 820 with the estimated delay or estimated RTT between the victim node(s) and the aggressor node(s) may enable the DU 820 to schedule a transmission by an aggressor node within the cyclic prefix of a transmission to be received by a victim node (or vice versa) and thereby mitigate the CLI that the aggressor node causes at the victim node.

In some aspects, the CLI measurement information that the CU 810 provides to the DU 820 may be filtered to include information related to only one or more CLI measurements that satisfy (e.g., equal or exceed) a threshold. For example, in some aspects, the CU 810 may filter the CLI measurement information directly reported by the downstream nodes managed by the CU 810 and/or the CLI measurement information reported by the neighboring CU 830 over the Xn interface to identify one or more neighboring DU cells, served UEs, and/or child IAB nodes that are aggressor nodes causing CLI that satisfies a threshold and/or one or more neighboring DU cells, served UEs, and/or child IAB nodes that are victim nodes experiencing CLI that satisfies a threshold. In such cases, the filtered information may further include one or more beam directions or beam identifiers (e.g., SSB indexes, SSB areas, CSI-RS indexes, and/or the like) of the victim nodes and/or the aggressor nodes that are associated with CLI that satisfies a threshold. In this way, signaling overhead between the CU 810 and the DU 820 may be reduced relative to providing detailed CLI measurement information, and the DU 820 may still take appropriate CLI mitigation action based at least in part on the victim nodes that are experiencing large CLI and/or the aggressor nodes that are causing large CLI.

In some aspects, the CU 810 may provide the CLI measurement information to the DU 820 based at least in part on a request from the DU 820. For example, in some aspects, the DU 820 may request CLI measurement information for one or more served UEs, child IAB nodes, or other downstream nodes 825 associated with the DU 820. Additionally, or alternatively, the DU 820 may request CLI measurement information for one or more neighboring cells of the DU 820 and/or one or more cells of the DU 820. In such cases, the request may further include one or more beam directions or beam identifiers of the victim nodes and/or the aggressor nodes, and the CU 810 may provide the CLI measurement information requested by the DU 820.

As further shown in FIG. 8, and by reference number 850, the DU 820 may perform one or more CLI mitigation actions based at least in part on the CLI measurement information provided by the CU 810. For example, in some aspects, the DU 820 may align a reception schedule of one or more cells of the DU 820 or one or more downstream nodes 825 of the DU 820 that are experiencing CLI with a reception schedule of one or more aggressor nodes that are causing the CLI. In another example, the DU 820 may align a transmission schedule of one or more cells of the DU 820 or one or more downstream nodes 825 that are causing CLI to avoid scheduling transmissions in one or more TTIs in which the victim nodes are scheduled to receive transmissions. As another example, the DU 820 may configure a TDD pattern for the DU 820 and/or the downstream nodes 825 connected to the DU 820 such that victim and aggressor nodes transmit at similar times and/or receive at similar times.

As another example, the DU 820 may adjust (e.g., reduce) a transmit power of the DU 820 or one or more downstream nodes 825 that are causing CLI experienced by victim nodes (e.g., neighboring DUs, UEs, child IAB nodes, and/or the like). As another example, the DU 820 may configure one or more handover parameters (e.g., cell reselection criteria) for the downstream nodes 825 to mitigate the CLI (e.g., forcing aggressor and/or victim nodes to handover to another cell to mitigate the CLI caused by and/or experienced by the downstream nodes 825), may schedule interfering transmissions within a cyclic prefix of one another based at least in part on an estimated delay or an estimated RTT between the victim and aggressor nodes, and/or the like. In this way, the CU 810 may provide the DU 820 with CU-DU signaling to report CLI measurements that can be integrated into a local CLI management framework of the DU 820. In this way, the DU 820 may detect and/or mitigate CLI that may be caused by and/or experienced by downstream nodes 825 connected to the DU 820 and/or one or more cells of the DU 820.

As indicated above, FIG. 8 is provided as an example. Other examples are possible and may differ from what was described with respect to FIG. 8.

Figure 9:
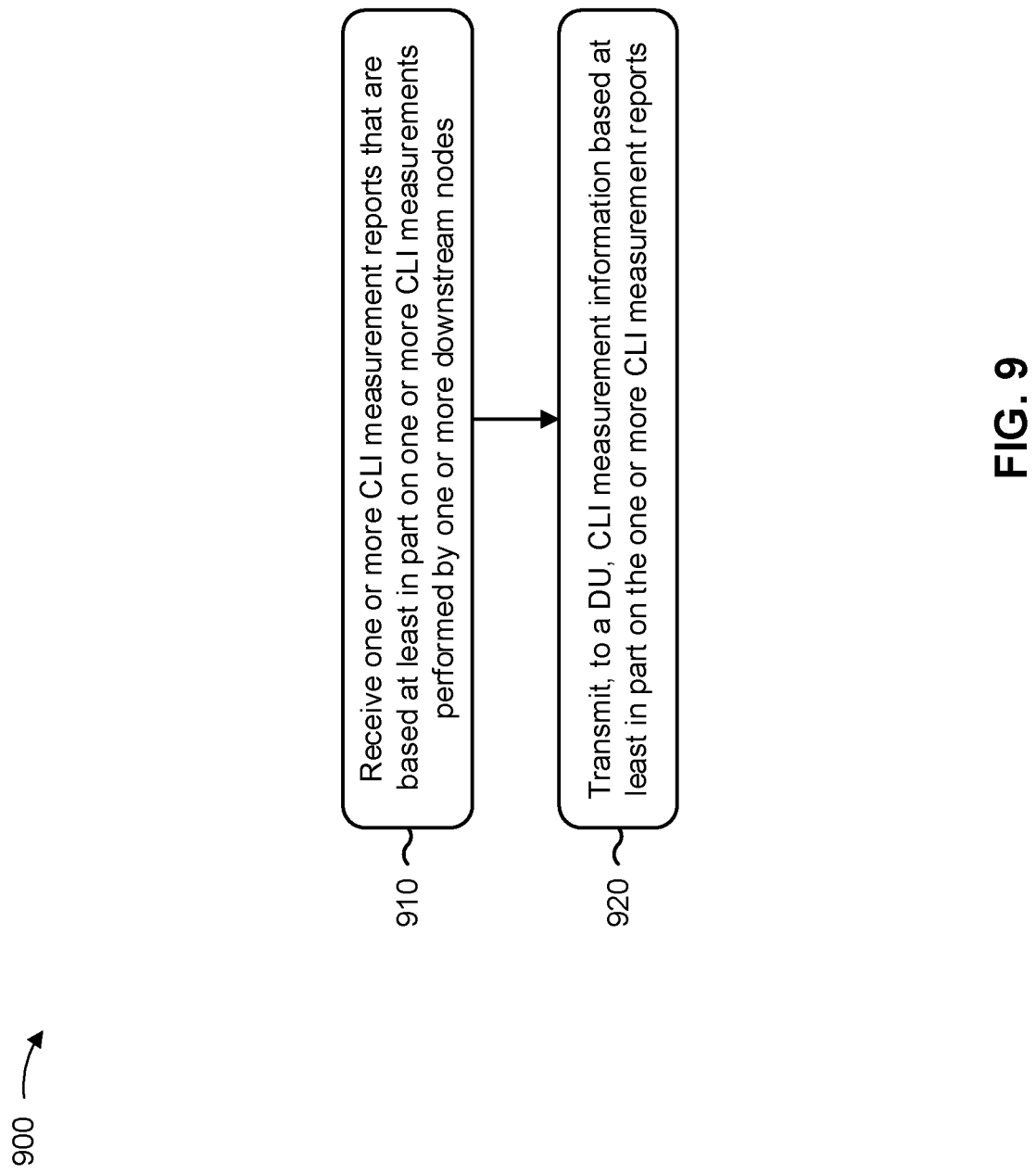
FIGS. 9-10 are diagrams illustrating example processes associated with CU-DU signaling to report CLI measurements, in accordance with the present disclosure.

FIG. 9 is a diagram illustrating an example process 900 performed, for example, by a CU, in accordance with the present disclosure. Example process 900 is an example where the CU (e.g., CU 710, CU 810, and/or CU 830) performs operations associated with CU-DU signaling to report CLI measurements.

As shown in FIG. 9, in some aspects, process 900 may include receiving one or more CLI measurement reports that are based at least in part on one or more CLI measurements performed by one or more downstream nodes (block 910). For example, the CU (e.g., using reception component 1102, depicted in FIG. 11) may receive one or more CLI measurement reports that are based at least in part on one or more CLI measurements performed by one or more downstream nodes, as described above.

As further shown in FIG. 9, in some aspects, process 900 may include transmitting, to a DU, CLI measurement information based at least in part on the one or more CLI measurement reports (block 920). For example, the CU (e.g., using transmission component 1104, depicted in FIG. 11) may transmit, to a DU, CLI measurement information based at least in part on the one or more CLI measurement reports, as described above.

Process 900 may include additional aspects, such as any single aspect or any combination of aspects described below and/or in connection with one or more other processes described elsewhere herein.

In a first aspect, the CLI measurement information includes one or more CLI measurements reported by one or more UEs served by the DU or one or more child nodes associated with the DU.

In a second aspect, alone or in combination with the first aspect, the CLI measurement information includes one or more CLI measurements that are reported by one or more UEs or child nodes associated with a neighboring DU to indicate potential CLI caused by one or more UEs or one or more child nodes associated with the DU.

In a third aspect, alone or in combination with one or more of the first and second aspects, the CLI measurement information includes one or more CLI measurements that are reported by a neighboring DU to indicate potential CLI caused by one or more UEs, one or more child nodes, or one or more cells associated with the DU.

In a fourth aspect, alone or in combination with one or more of the first through third aspects, the CLI measurement information includes CLI metrics included in the one or more CLI measurement reports, and identifiers associated with one or more victim nodes experiencing CLI and one or more aggressor nodes potentially causing the CLI experienced by the one or more victim nodes.

In a fifth aspect, alone or in combination with one or more of the first through fourth aspects, the CLI measurement information includes identifiers associated with one or more beams, or one or more measurement resources associated with one or more victim nodes experiencing CLI or one or more aggressor nodes potentially causing the CLI experienced by the one or more victim nodes.

In a sixth aspect, alone or in combination with one or more of the first through fifth aspects, the CLI measurement information includes an estimated delay or an estimated round trip time between one or more victim nodes experiencing CLI and one or more aggressor nodes potentially causing the CLI experienced by the one or more victim nodes.

In a seventh aspect, alone or in combination with one or more of the first through sixth aspects, the CLI measurement information identifies one or more cells, one or more served UEs, or one or more child nodes associated with the DU or a neighboring DU that are causing or experiencing CLI that satisfies a threshold.

In an eighth aspect, alone or in combination with one or more of the first through seventh aspects, the CLI measurement information indicates one or more beam directions associated with one or more cells, one or more served UEs, or one or more child nodes associated with the DU or a neighboring DU that are causing or experiencing CLI that satisfies a threshold.

In a ninth aspect, alone or in combination with one or more of the first through eighth aspects, process 900 includes receiving, from the DU, a request for CLI measurement information associated with one or more UEs served by the DU, one or more child nodes associated with the DU, one or more cells associated with the DU, or one or more neighboring cells associated with the DU, wherein the CLI measurement information is transmitted to the DU based at least in part on the request.

In a tenth aspect, alone or in combination with one or more of the first through ninth aspects, the request indicates one or more beam directions associated with one or more victim nodes experiencing CLI or one or more aggressor nodes potentially causing the CLI experienced by the one or more victim nodes.

In an eleventh aspect, alone or in combination with one or more of the first through tenth aspects, the one or more downstream nodes include one or more UEs served by the DU, one or more child nodes associated with the DU, one or more neighboring DUs, or one or more UEs or one or more child nodes associated with the one or more neighboring DUs.

In a twelfth aspect, alone or in combination with one or more of the first through eleventh aspects, the one or more downstream nodes are associated with the CU and the one or more CLI measurement reports are received from the one or more downstream nodes associated with the CU.

In a thirteenth aspect, alone or in combination with one or more of the first through twelfth aspects, the one or more downstream nodes are associated with another CU and the one or more CLI measurement reports are received from the other CU over an Xn interface.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
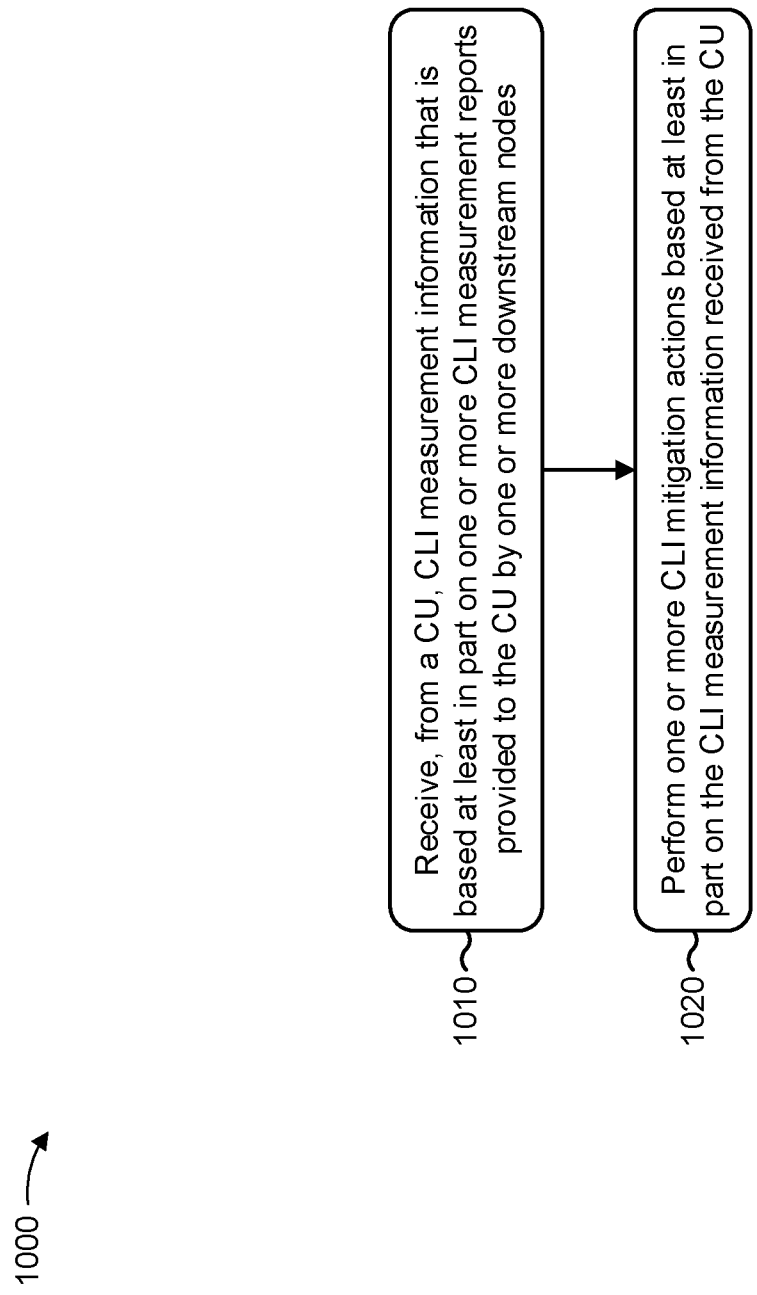

FIG. 10 is a diagram illustrating an example process 1000 performed, for example, by a du, in accordance with the present disclosure. Example process 1000 is an example where the DU (e.g., DU 720, DU 730, DU 820, and/or the like) performs operations associated with CU-DU signaling to report CLI measurements.

As shown in FIG. 10, in some aspects, process 1000 may include receiving, from a CU, CLI measurement information that is based at least in part on one or more CLI measurement reports provided to the CU by one or more downstream nodes (block 1010). For example, the du (e.g., using reception component 1202, depicted in FIG. 12) may receive, from a CU, CLI measurement information that is based at least in part on one or more CLI measurement reports provided to the CU by one or more downstream nodes, as described above.

As further shown in FIG. 10, in some aspects, process 1000 may include performing one or more CLI mitigation actions based at least in part on the CLI measurement information received from the CU (block 1020). For example, the DU (e.g., using CLI management component 1208, depicted in FIG. 12) may perform one or more CLI mitigation actions based at least in part on the CLI measurement information received from the CU, as described above.

Process 1000 may include additional aspects, such as any single aspect or any combination of aspects described below and/or in connection with one or more other processes described elsewhere herein.

In a first aspect, the CLI measurement information includes one or more CLI measurements reported by one or more UEs served by the DU or one or more child nodes associated with the DU.

In a second aspect, alone or in combination with the first aspect, the CLI measurement information includes one or more CLI measurements that are reported by one or more UEs or child nodes associated with a neighboring DU to indicate potential CLI caused by one or more UEs or one or more child nodes associated with the DU.

In a third aspect, alone or in combination with one or more of the first and second aspects, the CLI measurement information includes one or more CLI measurements that are reported by a neighboring DU to indicate potential CLI caused by one or more UEs, one or more child nodes, or one or more cells associated with the DU.

In a fourth aspect, alone or in combination with one or more of the first through third aspects, the CLI measurement information includes CLI metrics included in the one or more CLI measurement reports, and identifiers associated with one or more victim nodes experiencing CLI and one or more aggressor nodes potentially causing the CLI experienced by the one or more victim nodes.

In a fifth aspect, alone or in combination with one or more of the first through fourth aspects, the CLI measurement information includes identifiers associated with one or more beams, or one or more measurement resources associated with one or more victim nodes experiencing CLI or one or more aggressor nodes potentially causing the CLI experienced by the one or more victim nodes.

In a sixth aspect, alone or in combination with one or more of the first through fifth aspects, the CLI measurement information includes an estimated delay or an estimated round trip time between one or more victim nodes experiencing CLI and one or more aggressor nodes potentially causing the CLI experienced by the one or more victim nodes.

In a seventh aspect, alone or in combination with one or more of the first through sixth aspects, the CLI measurement information identifies one or more cells, one or more served UEs, or one or more child nodes associated with the DU or a neighboring DU that are causing or experiencing CLI that satisfies a threshold.

In an eighth aspect, alone or in combination with one or more of the first through seventh aspects, the CLI measurement information indicates one or more beam directions associated with one or more cells, one or more served UEs, or one or more child nodes associated with the DU or a neighboring DU that are causing or experiencing CLI that satisfies a threshold.

In a ninth aspect, alone or in combination with one or more of the first through eighth aspects, process 1000 includes transmitting, to the CU, a request for CLI measurement information associated with one or more UEs served by the DU, one or more child nodes associated with the DU, one or more cells associated with the DU, or one or more neighboring cells associated with the DU, wherein the CLI measurement information is received from the CU based at least in part on the request.

In a tenth aspect, alone or in combination with one or more of the first through ninth aspects, the request indicates one or more beam directions associated with one or more victim nodes experiencing CLI or one or more aggressor nodes potentially causing the CLI experienced by the one or more victim nodes.

In an eleventh aspect, alone or in combination with one or more of the first through tenth aspects, the one or more downstream nodes include one or more UEs served by the DU, one or more child nodes associated with the DU, one or more neighboring DUs, or one or more UEs or one or more child nodes associated with the one or more neighboring DUs.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
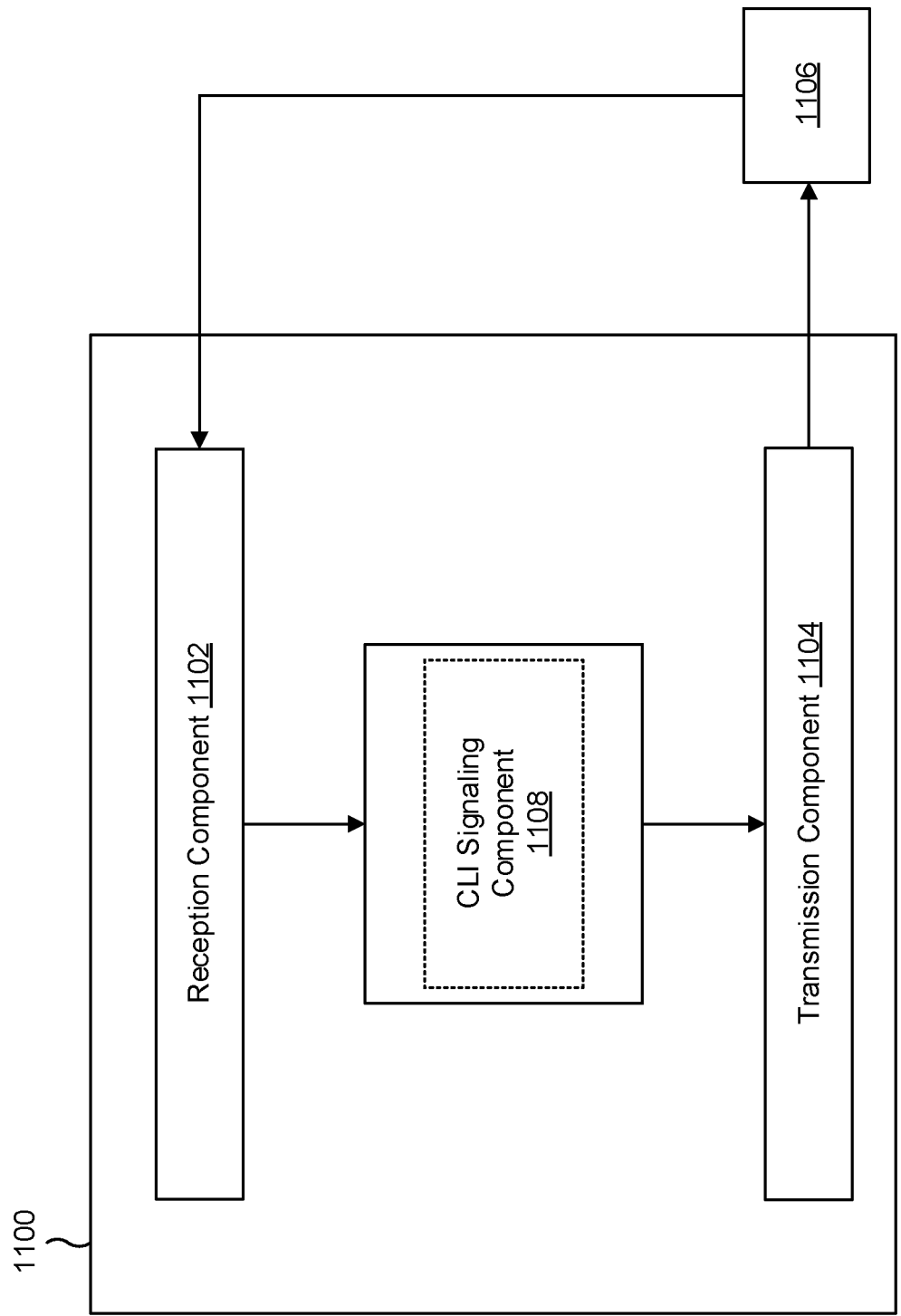
FIGS. 11-12 are block diagrams of example apparatuses for wireless communication, in accordance with the present disclosure.

FIG. 11 is a block diagram of an example apparatus 1100 for wireless communication. The apparatus 1100 may be a CU, or a CU may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, a CU, or another wireless communication device) using the reception component 1102 and the transmission component 1104. As further shown, the apparatus 1100 may include a CLI signaling component 1108, among other examples.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the base station described above in connection with FIG. 2. Additionally, or alternatively, one or more components shown in FIG. 11 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1106. In some aspects, the reception component 1102 may include one or more antennas, a demodulator, a MIMO detector, a receive processor, a controller/processor, a memory, or a combination thereof, of the base station described above in connection with FIG. 2.

The transmission component 1104 may transmit communications, such as reference signals, control information, data communications, or a combination thereof, to the apparatus 1106. In some aspects, one or more other components of the apparatus 1106 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modulator, a transmit MIMO processor, a transmit processor, a controller/processor, a memory, or a combination thereof, of the base station described above in connection with FIG. 2. In some aspects, the transmission component 1104 may be co-located with the reception component 1102 in a transceiver.

The reception component 1102 may receive one or more CLI measurement reports that are based at least in part on one or more CLI measurements performed by one or more downstream nodes. The CLI signaling component 1108 may transmit, or may cause transmission component 1104 to transmit, to a DU, CLI measurement information based at least in part on the one or more CLI measurement reports. In some aspects, the CLI signaling component 1108 may include one or more antennas, a modulator, a transmit MIMO processor, a transmit processor, a controller/processor, a memory, or a combination thereof, of the base station described above in connection with FIG. 2.

The reception component 1102 may receive, from the DU, a request for CLI measurement information associated with one or more UEs served by the DU, one or more child nodes associated with the DU, one or more cells associated with the DU, or one or more neighboring cells associated with the DU, wherein the CLI signaling component 1108 may transmit, or may cause transmission component 1104 to transmit, the CLI measurement information to the DU based at least in part on the request.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
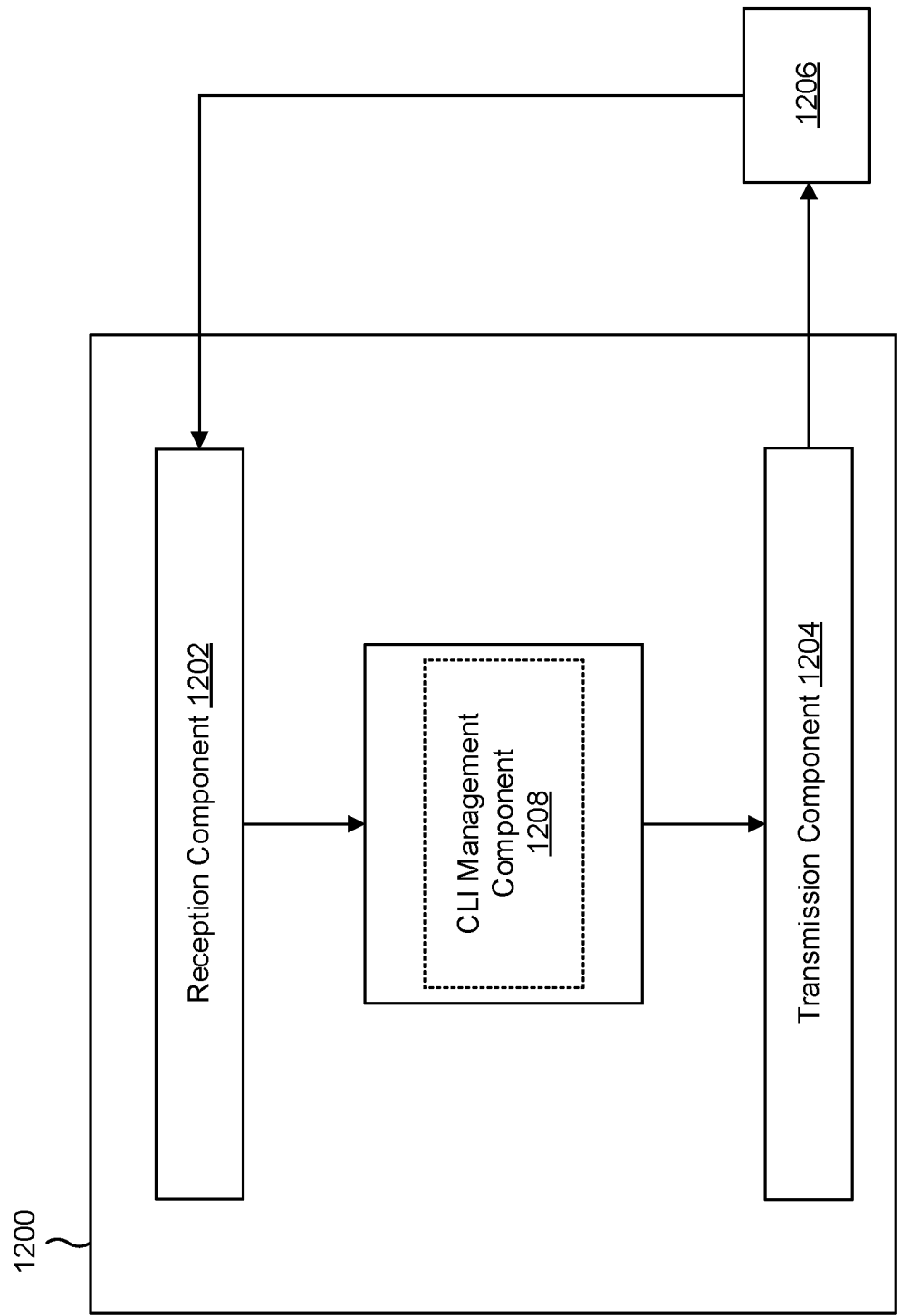

FIG. 12 is a block diagram of an example apparatus 1200 for wireless communication. The apparatus 1200 may be a DU, or a DU may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include a CLI management component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described above in connection with FIG. 2. Additionally, or alternatively, one or more components shown in FIG. 12 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1206. In some aspects, the reception component 1202 may include one or more antennas, a demodulator, a MIMO detector, a receive processor, a controller/processor, a memory, or a combination thereof, of the base station described above in connection with FIG. 2.

The transmission component 1204 may transmit communications, such as reference signals, control information, data communications, or a combination thereof, to the apparatus 1206. In some aspects, one or more other components of the apparatus 1206 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modulator, a transmit MIMO processor, a transmit processor, a controller/processor, a memory, or a combination thereof, of the base station described above in connection with FIG. 2. In some aspects, the transmission component 1204 may be co-located with the reception component 1202 in a transceiver.

The reception component 1202 may receive, from a CU, CLI measurement information that is based at least in part on one or more CLI measurement reports provided to the CU by one or more downstream nodes. The CLI management component 1208 may perform one or more CLI mitigation actions based at least in part on the CLI measurement information received from the CU. In some aspects, the CLI management component 1208 may include one or more antennas, a demodulator, a MIMO detector, a receive processor, a modulator, a transmit MIMO processor, a transmit processor, a controller/processor, a memory, or a combination thereof, of the base station described above in connection with FIG. 2.

The transmission component 1204 may transmit, to the CU, a request for CLI measurement information associated with one or more UEs served by the DU, one or more child nodes associated with the DU, one or more cells associated with the DU, or one or more neighboring cells associated with the DU, and the CLI measurement information is received from the CU based at least in part on the request.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a CU, comprising: receiving one or more CLI measurement reports that are based at least in part on one or more CLI measurements performed by one or more downstream nodes; and transmitting, to a DU, CLI measurement information based at least in part on the one or more CLI measurement reports.

Aspect 2: The method of Aspect 1, wherein the CLI measurement information includes one or more CLI measurements reported by one or more UEs served by the DU or one or more child nodes associated with the DU.

Aspect 3: The method of any of Aspects 1-2, wherein the CLI measurement information includes one or more CLI measurements that are reported by one or more UEs or child nodes associated with a neighboring DU to indicate potential CLI caused by one or more UEs or one or more child nodes associated with the DU.

Aspect 4: The method of any of Aspects 1-3, wherein the CLI measurement information includes one or more CLI measurements that are reported by a neighboring DU to indicate potential CLI caused by one or more UEs, one or more child nodes, or one or more cells associated with the DU.

Aspect 5: The method of any of Aspects 1-4, wherein the CLI measurement information includes CLI metrics included in the one or more CLI measurement reports, and identifiers associated with one or more victim nodes experiencing CLI and one or more aggressor nodes potentially causing the CLI experienced by the one or more victim nodes.

Aspect 6: The method of any of Aspects 1-5, wherein the CLI measurement information includes identifiers associated with one or more beams, or one or more measurement resources associated with one or more victim nodes experiencing CLI or one or more aggressor nodes potentially causing the CLI experienced by the one or more victim nodes.

Aspect 7: The method of any of Aspects 1-6, wherein the CLI measurement information includes an estimated delay or an estimated round trip time between one or more victim nodes experiencing CLI and one or more aggressor nodes potentially causing the CLI experienced by the one or more victim nodes.

Aspect 8: The method of any of Aspects 1-7, wherein the CLI measurement information identifies one or more cells, one or more served UEs, or one or more child nodes associated with the DU or a neighboring DU that are causing or experiencing CLI that satisfies a threshold.

Aspect 9: The method of any of Aspects 1-8, wherein the CLI measurement information indicates one or more beam directions associated with one or more cells, one or more served UEs, or one or more child nodes associated with the DU or a neighboring DU that are causing or experiencing CLI that satisfies a threshold.

Aspect 10: The method of any of Aspects 1-9, further comprising: receiving, from the DU, a request for CLI measurement information associated with one or more UEs served by the DU, one or more child nodes associated with the DU, one or more cells associated with the DU, or one or more neighboring cells associated with the DU, wherein the CLI measurement information is transmitted to the DU based at least in part on the request.

Aspect 11: The method of Aspect 10, wherein the request indicates one or more beam directions associated with one or more victim nodes experiencing CLI or one or more aggressor nodes potentially causing the CLI experienced by the one or more victim nodes.

Aspect 12: The method of any of Aspects 1-11, wherein the one or more downstream nodes include one or more UEs served by the DU, one or more child nodes associated with the DU, one or more neighboring DUs, or one or more UEs or one or more child nodes associated with the one or more neighboring DUs.

Aspect 13: The method of any of Aspects 1-12, wherein the one or more downstream nodes are associated with the CU and the one or more CLI measurement reports are received from the one or more downstream nodes associated with the CU.

Aspect 14: The method of any of Aspects 1-13, wherein the one or more downstream nodes are associated with another CU and the one or more CLI measurement reports are received from the other CU over an Xn interface.

Aspect 15: A method of wireless communication performed by a DU, comprising: receiving, from a CU, CLI measurement information that is based at least in part on one or more CLI measurement reports provided to the CU by one or more downstream nodes; and performing one or more CLI mitigation actions based at least in part on the CLI measurement information received from the CU.

Aspect 16: The method of Aspect 15, wherein the CLI measurement information includes one or more CLI measurements reported by one or more UEs served by the DU or one or more child nodes associated with the DU.

Aspect 17: The method of any of Aspects 15-16, wherein the CLI measurement information includes one or more CLI measurements that are reported by one or more UEs or child nodes associated with a neighboring DU to indicate potential CLI caused by one or more UEs or one or more child nodes associated with the DU.

Aspect 18: The method of any of Aspects 15-17, wherein the CLI measurement information includes one or more CLI measurements that are reported by a neighboring DU to indicate potential CLI caused by one or more UEs, one or more child nodes, or one or more cells associated with the DU.

Aspect 19: The method of any of Aspects 15-18, wherein the CLI measurement information includes CLI metrics included in the one or more CLI measurement reports, and identifiers associated with one or more victim nodes experiencing CLI and one or more aggressor nodes potentially causing the CLI experienced by the one or more victim nodes.

Aspect 20: The method of any of Aspects 15-19, wherein the CLI measurement information includes identifiers associated with one or more beams, or one or more measurement resources associated with one or more victim nodes experiencing CLI or one or more aggressor nodes potentially causing the CLI experienced by the one or more victim nodes.

Aspect 21: The method of any of Aspects 15-20, wherein the CLI measurement information includes an estimated delay or an estimated round trip time between one or more victim nodes experiencing CLI and one or more aggressor nodes potentially causing the CLI experienced by the one or more victim nodes.

Aspect 22: The method of any of Aspects 15-21, wherein the CLI measurement information identifies one or more cells, one or more served UEs, or one or more child nodes associated with the DU or a neighboring DU that are causing or experiencing CLI that satisfies a threshold.

Aspect 23: The method of any of Aspects 15-22, wherein the CLI measurement information indicates one or more beam directions associated with one or more cells, one or more served UEs, or one or more child nodes associated with the DU or a neighboring DU that are causing or experiencing CLI that satisfies a threshold.

Aspect 24: The method of any of Aspects 15-23, further comprising: transmitting, to the CU, a request for CLI measurement information associated with one or more UEs served by the DU, one or more child nodes associated with the DU, one or more cells associated with the DU, or one or more neighboring cells associated with the DU, wherein the CLI measurement information is received from the CU based at least in part on the request.

Aspect 25: The method of Aspect 24, wherein the request indicates one or more beam directions associated with one or more victim nodes experiencing CLI or one or more aggressor nodes potentially causing the CLI experienced by the one or more victim nodes.

Aspect 26: The method of any of Aspects 15-25, wherein the one or more downstream nodes include one or more UEs served by the DU, one or more child nodes associated with the DU, one or more neighboring DUs, or one or more UEs or one or more child nodes associated with the one or more neighboring DUs.

Aspect 27: An apparatus for wireless communication at a device, comprising a processor; memory coupled with the processor; and instructions stored in the memory and executable by the processor to cause the apparatus to perform the method of one or more of Aspects 1-14.

Aspect 28: A device for wireless communication, comprising a memory and one or more processors coupled to the memory, the one or more processors configured to perform the method of one or more of Aspects 1-14.

Aspect 29: An apparatus for wireless communication, comprising at least one means for performing the method of one or more of Aspects 1-14.

Aspect 30: A non-transitory computer-readable medium storing code for wireless communication, the code comprising instructions executable by a processor to perform the method of one or more of Aspects 1-14.

Aspect 31: A non-transitory computer-readable medium storing a set of instructions for wireless communication, the set of instructions comprising one or more instructions that, when executed by one or more processors of a device, cause the device to perform the method of one or more of Aspects 1-14.

Aspect 32: An apparatus for wireless communication at a device, comprising a processor; memory coupled with the processor; and instructions stored in the memory and executable by the processor to cause the apparatus to perform the method of one or more of Aspects 15-26.

Aspect 33: A device for wireless communication, comprising a memory and one or more processors coupled to the memory, the one or more processors configured to perform the method of one or more of Aspects 15-26.

Aspect 34: An apparatus for wireless communication, comprising at least one means for performing the method of one or more of Aspects 15-26.

Aspect 35: A non-transitory computer-readable medium storing code for wireless communication, the code comprising instructions executable by a processor to perform the method of one or more of Aspects 15-26.

Aspect 36: A non-transitory computer-readable medium storing a set of instructions for wireless communication, the set of instructions comprising one or more instructions that, when executed by one or more processors of a device, cause the device to perform the method of one or more of Aspects 15-26.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A central unit (CU) for wireless communication, comprising:
    a memory; and
        one or more processors, coupled to the memory, configured to:
    receive one or more cross-link interference (CLI) measurement reports that are based at least in part on one or more CLI measurements performed by one or more downstream nodes; and
    transmit, to a distributed unit (DU), CLI measurement information based at least in part on the one or more CLI measurement reports, wherein the CLI measurement information includes one or more CLI measurements reported by one or more user equipments served by the DU or one or more child nodes associated with the DU.

2. The CU of claim 1, wherein the CLI measurement information additionally includes one or more CLI measurements that are reported by one or more user equipments or child nodes associated with a neighboring DU to indicate potential CLI caused by the one or more user equipments served by the DU or the one or more child nodes associated with the DU.

3. The CU of claim 1, wherein the CLI measurement information additionally includes one or more CLI measurements that are reported by a neighboring DU to indicate potential CLI caused by the one or more user equipments served by the DU, the one or more child nodes associated with the DU, or one or more cells associated with the DU.

4. The CU of claim 1, wherein the CLI measurement information includes CLI metrics included in the one or more CLI measurement reports, and identifiers associated with one or more victim nodes experiencing CLI and one or more aggressor nodes potentially causing the CLI experienced by the one or more victim nodes.

5. The CU of claim 1, wherein the CLI measurement information includes identifiers associated with one or more beams, or one or more measurement resources associated with one or more victim nodes experiencing CLI or one or more aggressor nodes potentially causing the CLI experienced by the one or more victim nodes.

6. The CU of claim 1, wherein the CLI measurement information includes an estimated delay or an estimated round trip time between one or more victim nodes experiencing CLI and one or more aggressor nodes potentially causing the CLI experienced by the one or more victim nodes.

7. The CU of claim 1, wherein the CLI measurement information identifies one or more cells, one or more served user equipments, or one or more child nodes associated with the DU or a neighboring DU that are causing or experiencing CLI that satisfies a threshold.

8. The CU of claim 1, wherein the CLI measurement information indicates one or more beam directions associated with one or more cells, one or more served user equipments, or one or more child nodes associated with the DU or a neighboring DU that are causing or experiencing CLI that satisfies a threshold.

9. The CU of claim 1, wherein the one or more processors are further configured to:
    receive, from the DU, a request for the CLI measurement information, wherein the CLI measurement information is transmitted to the DU based at least in part on the request.

10. The CU of claim 9, wherein the request indicates one or more beam directions associated with one or more victim nodes experiencing CLI or one or more aggressor nodes potentially causing the CLI experienced by the one or more victim nodes.

11. The CU of claim 1, wherein the one or more downstream nodes include the one or more user equipments served by the DU, the one or more child nodes associated with the DU, one or more neighboring DUs, or one or more user equipments or one or more child nodes associated with the one or more neighboring DUs.

12. The CU of claim 1, wherein the one or more downstream nodes are associated with the CU and the one or more CLI measurement reports are received from the one or more downstream nodes associated with the CU.

13. The CU of claim 1, wherein the one or more downstream nodes are associated with another CU and the one or more CLI measurement reports are received from the other CU over an Xn interface.

14. A distributed unit (DU) for wireless communication, comprising:
    a memory; and one or more processors, coupled to the memory, configured to:
- receive, from a central unit (CU), cross-link interference (CLI) measurement information that is based at least in part on one or more CLI measurement reports provided to the CU by one or more downstream nodes; and
- perform one or more CLI mitigation actions based at least in part on the CLI measurement information received from the CU, wherein the CLI measurement information includes one or more CLI measurements reported by one or more user equipments served by the DU or one or more child nodes associated with the DU.

15. The DU of claim 14, wherein the CLI measurement information additionally includes one or more CLI measurements that are reported by one or more user equipments or child nodes associated with a neighboring DU to indicate potential CLI caused by the one or more user equipments served by the DU or the one or more child nodes associated with the DU.

16. The DU of claim 14, wherein the CLI measurement information includes one or more CLI measurements that are reported by a neighboring DU to indicate potential CLI caused by the one or more user equipments served by the DU, the one or more child nodes associated with the DU, or one or more cells associated with the DU.

17. The DU of claim 14, wherein the CLI measurement information includes CLI metrics included in the one or more CLI measurement reports, and identifiers associated with one or more victim nodes experiencing CLI and one or more aggressor nodes potentially causing the CLI experienced by the one or more victim nodes.

18. The DU of claim 14, wherein the CLI measurement information includes identifiers associated with one or more beams, or one or more measurement resources associated with one or more victim nodes experiencing CLI or one or more aggressor nodes potentially causing the CLI experienced by the one or more victim nodes.

19. The DU of claim 14, wherein the CLI measurement information includes an estimated delay or an estimated round trip time between one or more victim nodes experiencing CLI and one or more aggressor nodes potentially causing the CLI experienced by the one or more victim nodes.

20. The DU of claim 14, wherein the CLI measurement information identifies one or more cells, one or more served user equipments, or one or more child nodes associated with the DU or a neighboring DU that are causing or experiencing CLI that satisfies a threshold.

21. The DU of claim 14, wherein the CLI measurement information indicates one or more beam directions associated with one or more cells, one or more served user equipments, or one or more child nodes associated with the DU or a neighboring DU that are causing or experiencing CLI that satisfies a threshold.

22. The DU of claim 14, wherein the one or more processors are further configured to:
- transmit, to the CU, a request for the CLI measurement information, wherein the CLI measurement information is received from the CU based at least in part on the request.

23. The DU of claim 22, wherein the request indicates one or more beam directions associated with one or more victim nodes experiencing CLI or one or more aggressor nodes potentially causing the CLI experienced by the one or more victim nodes.

24. The DU of claim 14, wherein the one or more downstream nodes include one or more user equipments served by the DU, one or more child nodes associated with the DU, one or more neighboring DUs, or one or more user equipments or one or more child nodes associated with the one or more neighboring DUs.

25. A method of wireless communication performed by a central unit (CU), comprising:
- receiving one or more cross-link interference (CLI) measurement reports that are based at least in part on one or more CLI measurements performed by one or more downstream nodes; and
- transmitting, to a distributed unit (DU), CLI measurement information based at least in part on the one or more CLI measurement reports, wherein the CLI measurement information includes one or more CLI measurements reported by one or more user equipments served by the DU or one or more child nodes associated with the DU.

26. The method of claim 25, further comprising:
- receiving, from the DU, a request for the CLI measurement information, wherein the CLI measurement information is transmitted to the DU based at least in part on the request.

27. A method of wireless communication performed by a distributed unit (DU), comprising:
- receiving, from a central unit (CU), cross-link interference (CLI) measurement information that is based at least in part on one or more CLI measurement reports provided to the CU by one or more downstream nodes; and
- performing one or more CLI mitigation actions based at least in part on the CLI measurement information received from the CU, wherein the CLI measurement information includes one or more CLI measurements reported by one or more user equipments served by the DU or one or more child nodes associated with the DU.

28. The method of claim 27, further comprising:
- transmitting, to the CU, a request for the CLI measurement information, wherein the CLI measurement information is received from the CU based at least in part on the request.

* * * * *